(12) United States Patent
Coombs et al.

(10) Patent No.: US 12,552,213 B2
(45) Date of Patent: Feb. 17, 2026

(54) SYSTEMS AND METHODS FOR VEHICLE LOAD MANAGEMENT

(71) Applicant: AKTV8 LLC, Wixom, MI (US)

(72) Inventors: Joshua Coombs, East Lansing, MI (US); Jake Dunda, Brighton, MI (US); Bradley J. Kubiak, Fowlerville, MI (US)

(73) Assignee: AKTV 8 LLC, Wixom, MI (US)

( * ) Notice: Subject to any disclaimer, the term of this patent is extended or adjusted under 35 U.S.C. 154(b) by 137 days.

(21) Appl. No.: 18/038,642

(22) PCT Filed: Nov. 24, 2021

(86) PCT No.: PCT/US2021/060766
§ 371 (c)(1),
(2) Date: May 24, 2023

(87) PCT Pub. No.: WO2022/115566
PCT Pub. Date: Jun. 2, 2022

(65) Prior Publication Data
US 2024/0034116 A1   Feb. 1, 2024

Related U.S. Application Data

(60) Continuation-in-part of application No. 17/170,857, filed on Feb. 8, 2021, now Pat. No. 11,458,794, and (Continued)

(51) Int. Cl.
*B60G 17/015* (2006.01)
*B60G 17/0165* (2006.01)
(Continued)

(52) U.S. Cl.
CPC ..... *B60G 17/0152* (2013.01); *B60G 17/0165* (2013.01); *B60G 17/017* (2013.01);
(Continued)

(58) Field of Classification Search
CPC ............ B60G 17/0152; B60G 17/0165; B60G 17/017; B60G 17/0416; B60G 2202/15;
(Continued)

(56) References Cited

U.S. PATENT DOCUMENTS

| | | | | |
|---|---|---|---|---|
| 5,195,771 | A | * | 3/1993 | Eckert ................. B62D 61/125 267/31 |
| 6,145,859 | A | * | 11/2000 | Altherr .............. B60G 17/0416 280/124.159 |

(Continued)

*Primary Examiner* — Logan M Kraft
*Assistant Examiner* — John D Bailey
(74) *Attorney, Agent, or Firm* — William H. Honaker; Dickinson Wright PLLC

(57) ABSTRACT

A system for vehicle load management including a processor and a memory in communication with the processor and including instructions that, when executed by the processor, cause the processor to receive a first indicator signal from a first sensor. The instructions further cause the processor to, based at least in part to the first indicator signal, determine a vehicle load intervention. The instructions further cause the processor to, based, on the vehicle load intervention, transmit one or more adjustment signals to cause one or more vehicle load adjustments to occur, the one or more vehicle load adjustments including at least one of at least one tire being inflated, the at least one tire being deflated, a liftable axle being raised, and the liftable axle being lowered.

27 Claims, 12 Drawing Sheets

Related U.S. Application Data a continuation-in-part of application No. 17/141,185, filed on Jan. 4, 2021, now Pat. No. 11,571,941, which is a continuation of application No. 16/289,371, filed on Feb. 28, 2019, now Pat. No. 10,882,374, said application No. 17/170,857 is a division of application No. 15/862,405, filed on Jan. 4, 2018, now abandoned, said application No. 16/289,371 is a continuation of application No. 15/712,995, filed on Sep. 22, 2017, now Pat. No. 10,259,284, which is a continuation of application No. 14/971,520, filed on Dec. 16, 2015, now Pat. No. 9,834,056.

(60) Provisional application No. 63/117,996, filed on Nov. 24, 2020, provisional application No. 62/564,953, filed on Sep. 28, 2017, provisional application No. 62/442,119, filed on Jan. 4, 2017, provisional application No. 62/195,083, filed on Jul. 21, 2015, provisional application No. 62/119,740, filed on Feb. 23, 2015, provisional application No. 62/092,723, filed on Dec. 16, 2014.

(51) Int. Cl.
*B60G 17/017* (2006.01)
*B60G 17/04* (2006.01)

(52) U.S. Cl.
CPC ...... *B60G 17/0416* (2013.01); *B60G 2202/15* (2013.01); *B60G 2400/60* (2013.01); *B60G 2400/61* (2013.01); *B60G 2500/203* (2013.01); *B60G 2800/019* (2013.01); *B60G 2800/915* (2013.01)

(58) Field of Classification Search
CPC ............ B60G 2400/60; B60G 2400/61; B60G 2500/203; B60G 2800/019; B60G 2800/915
USPC .......................................................... 701/37
See application file for complete search history.

(56) References Cited

U.S. PATENT DOCUMENTS

| | | | | |
|---|---|---|---|---|
| 6,308,793 | B1* | 10/2001 | Eberling | B60G 17/0195 280/124.16 |
| 8,413,997 | B1* | 4/2013 | Coombs | B60G 17/017 280/6.151 |
| 2006/0170168 | A1* | 8/2006 | Rotz | B62D 61/12 180/209 |
| 2011/0079969 | A1* | 4/2011 | Amlie | B60G 17/0521 701/37 |
| 2013/0140784 | A1* | 6/2013 | Ehrlich | B60G 17/0528 280/124.159 |
| 2015/0202931 | A1* | 7/2015 | Honig | B60C 23/001 152/416 |
| 2017/0021687 | A1* | 1/2017 | Youngers | B60G 17/0525 |
| 2017/0113507 | A1* | 4/2017 | Lentz | B60G 17/0528 |
| 2017/0137023 | A1* | 5/2017 | Anderson | B60G 17/0165 |
| 2017/0349009 | A1* | 12/2017 | Ehrlich | B60C 23/00336 |
| 2018/0162182 | A1 | 6/2018 | Coombs | |
| 2018/0186208 | A1 | 7/2018 | Coombs | |
| 2018/0312018 | A1* | 11/2018 | Wilson | B60S 5/046 |
| 2021/0394574 | A1* | 12/2021 | Paielli | G01D 5/2046 |
| 2022/0153081 | A1* | 5/2022 | Henry | B60G 17/0155 |

\* cited by examiner

SYSTEMS AND METHODS FOR VEHICLE LOAD MANAGEMENT

RELATED APPLICATIONS

This application claims the benefit of claims the benefit of U.S. Provisional Patent Application No. 63/117,996, filed on Nov. 24, 2020; is a continuation-in-part of U.S. patent application Ser. No. 17/170,857, which is a division of U.S. patent application Ser. No. 15/862,405 filed on Jan. 4, 2018, which claims the benefit of U.S. Provisional Patent Application No. 62/442,119 filed Jan. 4, 2017, and U.S. Provisional Patent Application No. 62/564,953 filed Sep. 28, 2017; and is a continuation-in-part of Ser. No. 17/141,185, which is a continuation of U.S. application Ser. No. 16/289,371, now U.S. Pat. No. 10,882,374, filed 28 Feb. 2019, which is a continuation of U.S. application Ser. No. 15/712,995, now U.S. Pat. No. 10,259,284, filed 22 Sep. 2017, which is a continuation of U.S. application Ser. No. 14/971,520, now U.S. Pat. No. 9,834,056, filed 16 Dec. 2015, which claims the benefit of U.S. Provisional Application Ser. No. 62/092,723 filed 16 Dec. 2014, U.S. Provisional Application Ser. No. 62/119,740 filed 23 Feb. 2015, and U.S. Provisional Application Ser. No. 62/195,083 filed 21 Jul. 2015; all of which are incorporated herein in their entirety by reference.

TECHNICAL FIELD

This disclosure relates generally to the vehicle load management field, and more specifically to a new and useful system and method for analysis and control of vehicle pressure systems and liftable axles in the vehicle load management field.

BACKGROUND

Commercial vehicle manufacturers and commercial vehicle fleet operators are increasingly using liftable axles and tire inflation systems as a way to improve fuel economy in commercial vehicles with two or more axles. Liftable axles allow for operators to use fewer axles when loads are reduced, reducing rolling friction losses. Operators of vehicles with liftable axles may use integrated tire inflation systems to control tire pressures associated with the axles.

However, the use of liftable axles and integrated tire inflation systems has presented challenges of its own. Because brake and tire wear on brakes and tires associated with liftable axles is less than brake and tire wear associated with primary (not liftable) axles, brakes associated with liftable axles may require more repair resulting from "rot" or corrosion, while tires associated with liftable axles may require a vehicle to undergo more regular tire rotations to keep tire wear consistent across the vehicle.

Vehicle loads changing and axle loads changing, for instance as a result of the lifting of liftable axles, may result in underinflated and overinflated tires. A tire that is overinflated has a "cupped" tire patch where only the center of the tire patch is in contact with the road, reducing braking and cornering performance and creating uneven tire wear focused at the center of the tire. The sidewall of a tire that is underinflated will experience flexing, causing high levels of internal stress and heating and contributing to tire wear and blow-out risk. Underinflated tires are also unstable in cornering, with a risk that the sidewall collapses, contributing to instability while cornering and contributing to loss of vehicle control and roll-over risks.

Tire leaks are common in commercial vehicles, as are axle wheel end lube and bearing failures, as well as blow-outs. Liftable axles also offer an opportunity to manage these conditions, allowing the vehicle operator to lift the failed axle and safely move the vehicle for repair. Liftable axle management may also optimize wear distribution, improving safety and uptime for the vehicle.

Thus, there is a need in the vehicle load management field for a new and useful system and/or method to address issues such as those described above, and other related load management issues.

SUMMARY

This disclosure relates generally to systems and methods for vehicle load management.

An aspect of the present disclosure is a system for vehicle load management including a processor and a memory in communication with the processor. The memory includes instructions that, when executed by the processor, cause the processor to receive a first indicator signal from a first sensor, the first indicator signal including one or more of a first tire pressure indicator signal from a first tire pressure sensor configured to measure a first tire pressure of a first tire configured to rotate about a first axle; a first wheel end indicator signal from a first wheel end sensor connected to the first axle, the first tire, or a first wheel connected to the first axle, configured to provide measurements of or proximate to the first axle, the first tire, or the first wheel, and including at least one of a first wheel end temperature sensor and a first wheel end accelerometer; a first load indicator signal from a first load sensor connected to the vehicle and configured to measure a first load of the vehicle; and a first height indicator signal from a first height sensor connected to the vehicle and configured to measure a distance within the vehicle. The instructions further cause the processor to, based at least in part to the first indicator signal, determine a vehicle load intervention The instructions further cause the processor to, based on the vehicle load intervention, transmit one or more adjustment signals to cause one or more vehicle load adjustments to occur, the one or more vehicle load adjustments including at least one of at least one tire being inflated, the at least one tire being deflated a liftable axle being raised, and the liftable axle being lowered.

Another aspect of the present disclosure is a method for axle and tire management of a vehicle. The method includes receiving a first indicator signal from a first sensor, the first indicator signal including one or more of a first tire pressure indicator signal from a first tire pressure sensor configured to measure a first tire pressure of a first tire configured to rotate about a first axle; a first wheel end indicator signal from a first wheel end sensor connected to the first axle, the first tire, or a first wheel connected to the first axle, configured to provide measurements of or proximate to the first axle, the first tire, or the first wheel, and including at least one of a first wheel end temperature sensor, and a first wheel end accelerometer; a first load indicator signal from a first load sensor connected to the vehicle and configured to measure a first load of the vehicle; and a first height indicator signal from a first height sensor connected to the vehicle and configured to measure a distance within the vehicle. The method further includes, responsive at least in part to the first indicator signal, determining a vehicle load intervention. The method further includes, based on the vehicle load intervention, transmitting one or more adjustment signals to cause one or more vehicle load adjustments to occur, the one or more vehicle load adjustments including at least one of at least one tire being inflated, the at least one tire being deflated, a liftable axle being raised, and the liftable axle being lowered.

These and other features and advantages of this disclosure will become more apparent to those skilled in the art from the detailed description of a preferred embodiment. The drawings that accompany the detailed description are described below.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
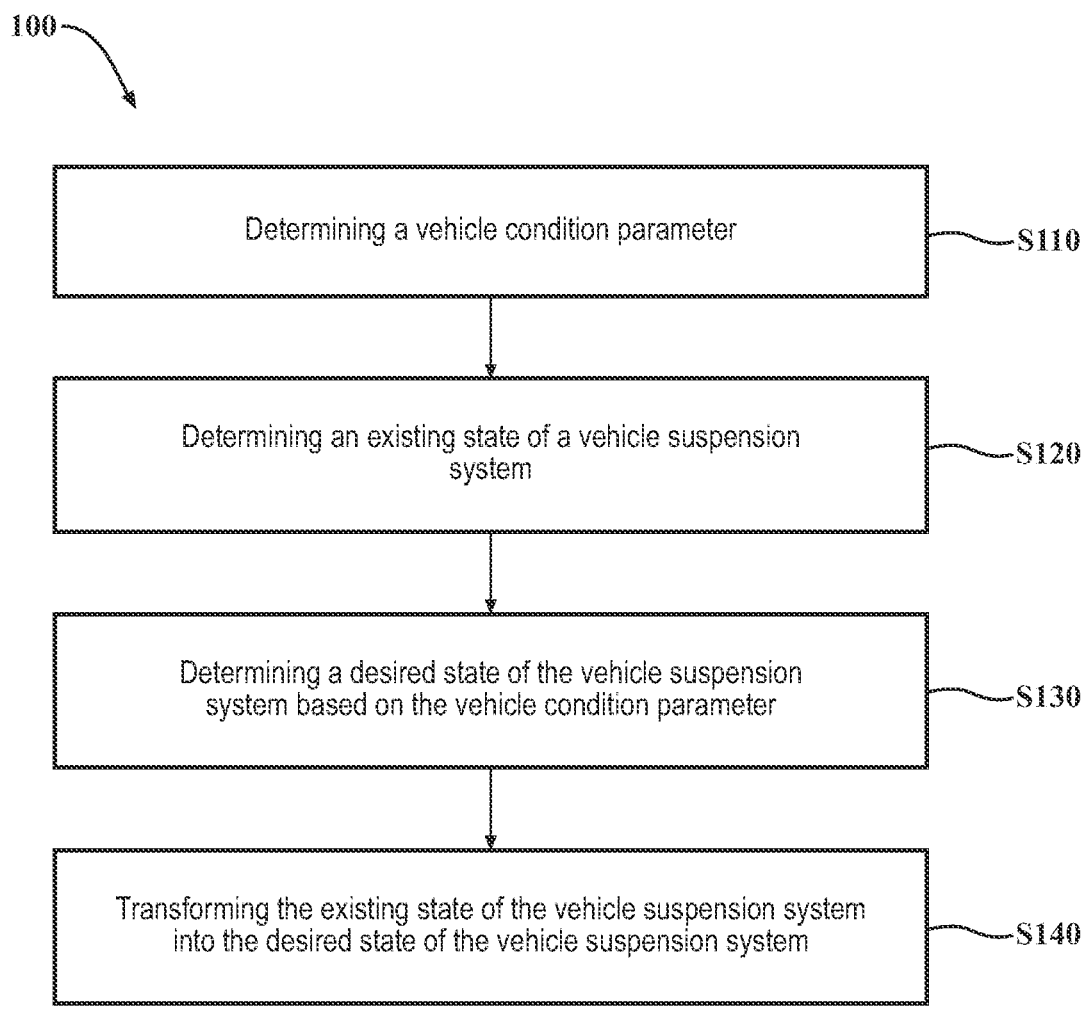
FIG. 1 is a flowchart depiction of a variation of the method according to principles of the present disclosure.

As shown in FIG. 1, the method 100 for vehicle load management includes: determining a vehicle condition parameter S110; determining an existing state of a vehicle suspension system S120; determining a desired state of the vehicle suspension system based on the vehicle condition parameter S130; and transforming the existing state of the vehicle suspension system into the desired state of the vehicle suspension system S140. The method 100 functions to manage the load carried by the vehicle (e.g., the vehicle load), and may include manipulating (e.g., actuating) the suspension system of the vehicle and/or instructing a vehicle operator to arrange the vehicle load such that the vehicle suspension system is transformed into the desired state. The method 100 may also function to actively control the attitude (e.g., roll angle, pitch angle, etc.) of the vehicle by controlling the stiffness and/or ride height of the suspension system. The method 100 may also function to determine a dynamical model of vehicle operation based on the vehicle load characteristics. The method 100 may additionally or alternatively have any other suitable vehicle load management function.

Figure 2:
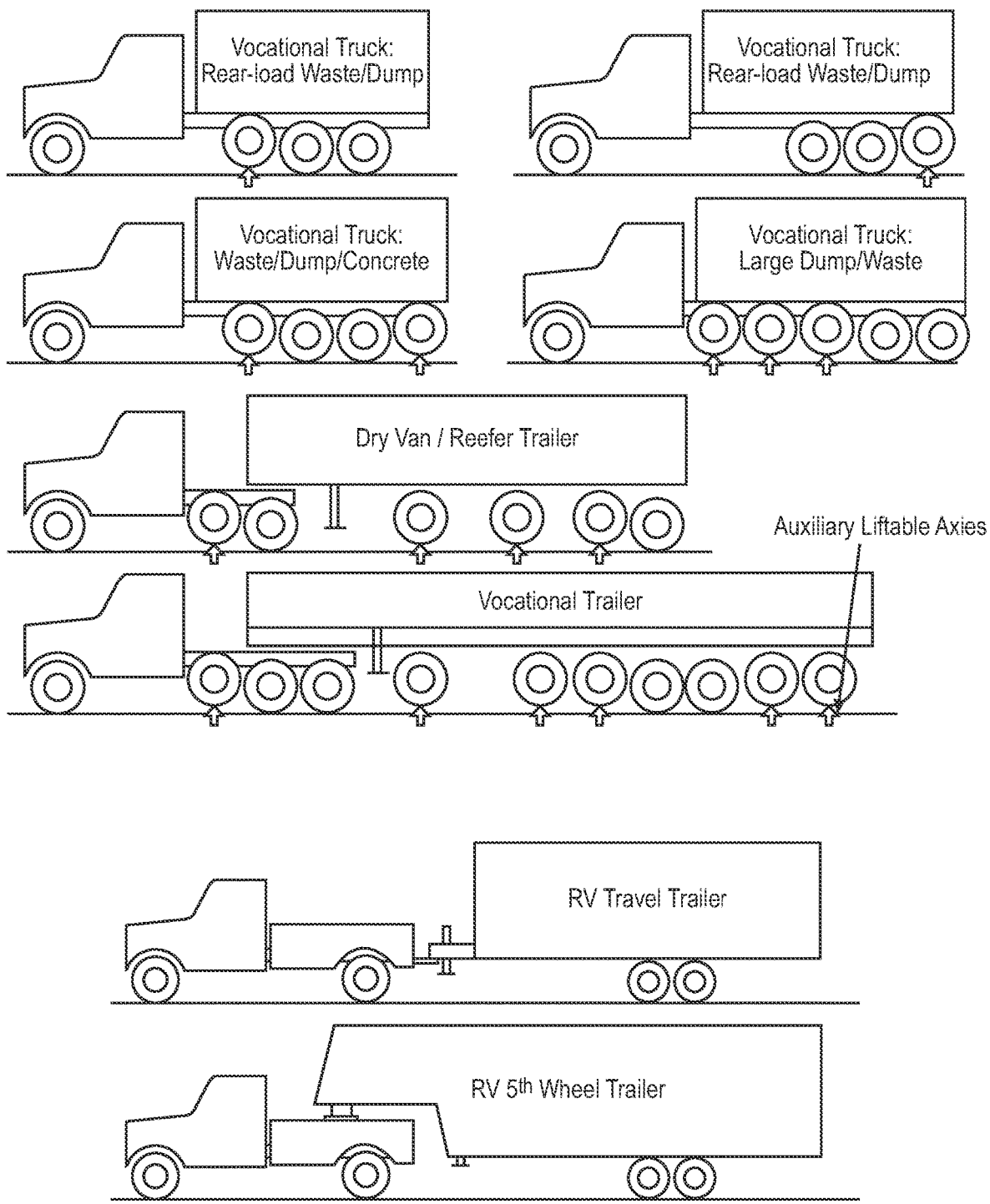
FIG. 2 is a side view of various example vehicle types and configurations at which variants of the method may be implemented according to the principles of the present disclosure.

The method 100 is preferably implemented in the context of a vehicle configured to transport cargo in a cargo compartment. As shown in FIG. 2, the vehicle may be a commercial truck (e.g., tractor trailer, hauler, rig, truck, vocational truck, rear-load, front-load, dry van/reefer trailer, vocational trailer, etc.), a recreational vehicle (e.g., camper van, motorhome, trailer, caravan, RV travel trailer, RV 5th wheel trailer, etc.), an oversized truck, and any other suitable vehicle, and may include any suitable number and configuration of auxiliary liftable axles (e.g., lift axles, drop axles, etc.). In alternative implementations of the method 100, the vehicle may be a consumer vehicle (e.g., a sedan, a minivan, a station wagon, etc.). In cases wherein the vehicle is a tractor trailer, the cargo compartment is preferably the trailer. In cases wherein the vehicle is a recreational vehicle, the cargo compartment is preferably the interior of the vehicle. However, the cargo compartment may additionally or alternatively be any suitable interior portion of any suitable vehicle.

Figure 3:
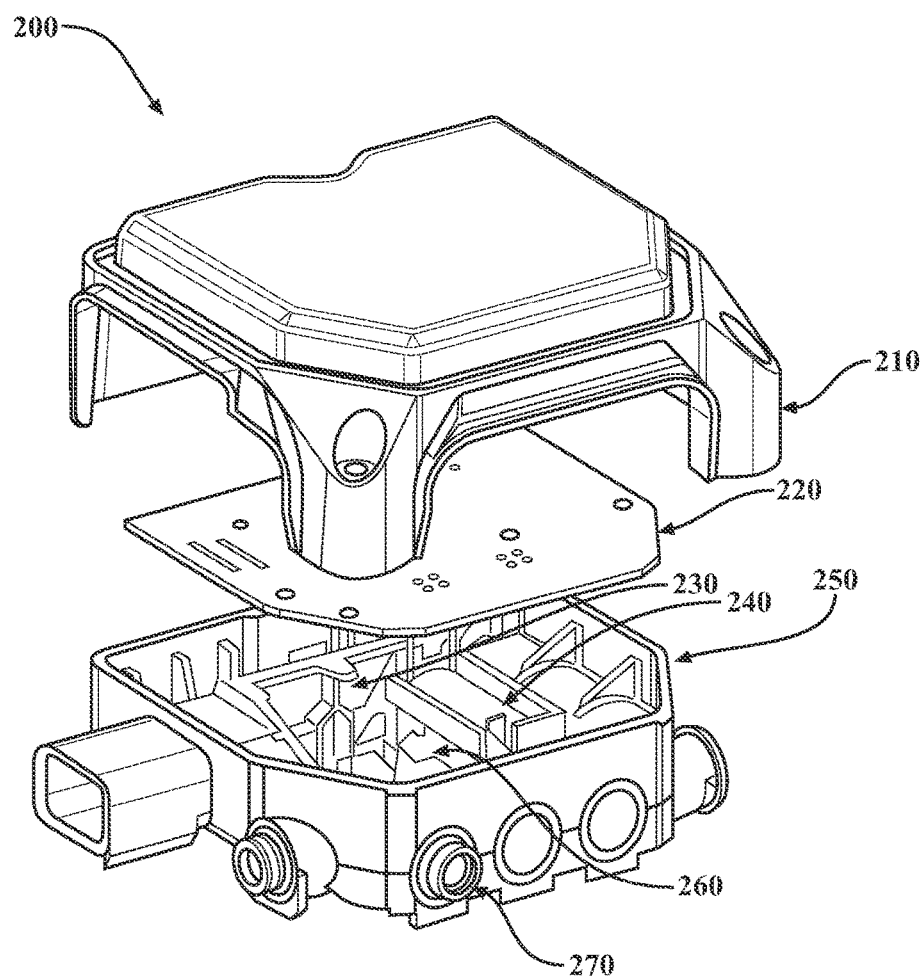
FIG. 3 is an exploded view of an example of the system according to the principles of the present disclosure.

The method 100 is preferably implemented, at least in part, using a system including an electronic control unit (ECU) 200 configured to control a fluid-based suspension system (e.g., a fluid suspension system, an air suspension system, a pneumatic system, etc.). The suspension system may include a primary suspension system (e.g., the suspension system corresponding to the drive axle or axles and primary driven axles) and a secondary suspension system (e.g., a lift axle suspension system, auxiliary suspension system, etc.). As shown in FIG. 3, the ECU 200 preferably includes an enclosure 210, a printed circuit board assembly (PCBA) 220, a valve retainer 230, a valve 240, a manifold 250, a pressure sensor 260, and a fitting 270. The system 200 preferably integrates valves, sensors, and the PCBA into a sealed module that functions control any device driven by fluid pressure (e.g., according to variants and/or portions of the method 200). The ECU 200 may also function to monitor supply pressure (e.g., from a compressor of the vehicle), and may restrict system operation to cases when the supply pressure is above a threshold value (e.g., an airbrake pressure protection threshold). The ECU 200 may also function to open valves to inflate or deflate points of control (e.g., air springs, load bag, lift bag, etc.), using any suitable method (e.g., using pulse width modulation to modulate flow to and from actuation points). The ECU 200 may also function to utilize secondary valves (e.g., driven by the primary valves) to increase system response speeds (e.g., wherein the secondary valves have higher flow rates than the primary valve). The ECU 200 may also function to monitor and report leak rates (e.g., via the CAN bus, via an alternative communication protocol such as Bluetooth, radio, etc.) from portions of the fluid suspension system. The ECU 200 may also function to connect to a remote device (e.g., via Bluetooth) to transmit system information and receive user input (e.g., control instructions). The ECU 200 may also function to connect to the vehicle computing architecture (e.g., CAN bus) and utilize data (e.g., contextual data) collected therefrom (e.g., vehicle speed, ABS active alert, steering wheel angle, geographic location, etc.) to implement portion(s) of the method 100. The ECU 200 may also function to monitor an on-board (e.g., integrated with the ECU) tri-axis accelerometer (or other inertial measurement unit) to determine vehicle attitude (e.g., ride height, ride angles, etc.) and/or vibration characteristics during vehicle operation (e.g., excessive vibration due to unbalanced and/or out-of-round tire, etc.). The ECU 200 may also function to monitor additional vehicle sensor outputs (e.g., brake pad wear sensors) and report the outputs to the vehicle computing architecture (e.g., transmit the output data to the CAN bus). The ECU 200 may additionally or alternatively have any suitable function.

In variations, the system 200 includes components substantially as described in U.S. application Ser. No. 15/712, 995, filed 22 Sep. 2017, and which is incorporated herein in its entirety by this reference. However, the method 100 may additionally or alternatively be implemented in conjunction with a system including any other suitable electronic control unit.

In some variations, the method 100 may include control of tire pressure using the system 200, which may be configured and utilized substantially as described in U.S. application Ser. No. 15/805,015, filed 6 Nov. 2017, and which is incorporated herein in its entirety by this reference. However, in alternative variations, the method 100 may otherwise suitably control tire pressure and/or omit tire pressure control.

In some variations, the method 100 may include the use of a location (e.g., location data). A location may be a set of geographic coordinates (e.g., latitude and longitude), a place name (e.g., county, city, landmark, intersection, etc.), a physical street address, distance from a given location, presence within a specified radius from a given location, a graphical depiction a map, or any other suitable location expression. Geolocation may involve geocoding to find associated latitude and longitude from other geographic data. Geolocation may additionally or alternatively involve reverse geocoding to back code latitude and longitude coordinates to a readable address or place name. The location may be determined based on GPS coordinates provided by a device, triangulation between mobile phone towers and public masts (e.g., assistive GPS), Wi-Fi connection location, WHOIS performed on IP address or MAC address, GSM/CDMA cell IDs, location information self-reported by a user, or determined in any other suitable manner. The location system may be a GPS system, cellular tower triangulation system, trilateration system, beacon system, or be any other suitable location system.

Figure 5:
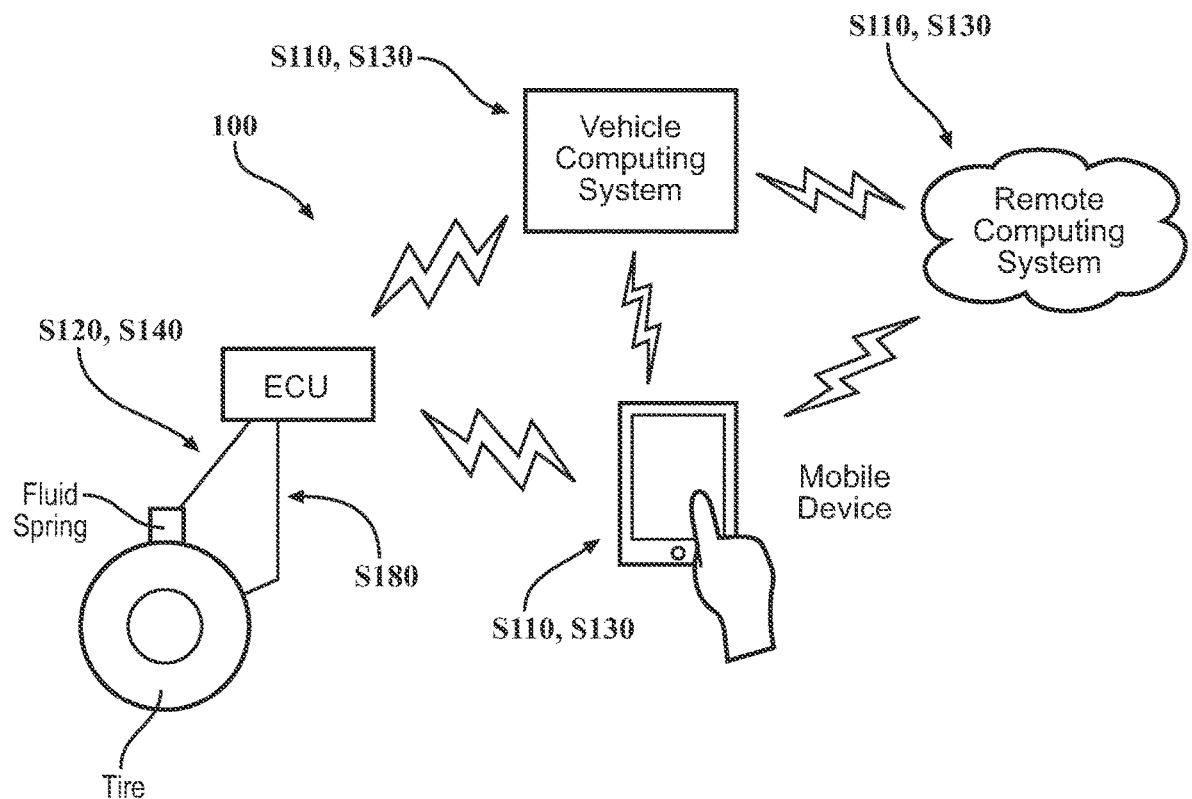
FIG. 5 is an illustration of example computing system components at which variants of the method may be implemented according to the principles of the present disclosure.

As shown in FIG. 5, the method 100 can, in variations, be implemented in conjunction with a mobile device, a remote computing system, and a vehicle computing system in addition to the ECU. Examples of the user device include a tablet, smartphone, mobile phone, laptop, watch, wearable device (e.g., glasses), or any other suitable user device. The user device may include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

Outputs may include: displays (e.g., LED display, OLED display, LCD, etc.), audio speakers, lights (e.g., LEDs), tactile outputs (e.g., a tixel system, vibratory motors, etc.), touchscreens, vehicle dashboards, or any other suitable output.

Inputs may include: touchscreens (e.g., capacitive, resistive, etc.), a mouse, a keyboard, a motion sensor, a microphone, a biometric input, a camera, or any other suitable input.

The communication system may include one or more radios or any other suitable component. The communication system may be a long-range communication system, a short-range communication system, or any other suitable communication system. The communication system may facilitate wired and/or wireless communication. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof.

Sensors of the system, device, and/or vehicle may include: cameras (e.g., visual range, multispectral, hyperspectral, IR, stereoscopic, etc.), orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, or any other suitable type of sensor.

The power supply is preferably a self-contained battery, but may additionally or alternatively include a wired connection to a vehicle battery, wireless connection (e.g., inductive charger, RFID charging, etc.), a battery (e.g., secondary or rechargeable battery, primary battery, etc.), energy harvesting system (e.g., solar cells, piezoelectric systems, pyroelectrics, thermoelectrics, etc.), or any other suitable system.

The location system may include a GPS unit, a GNSS unit, a triangulation unit that triangulates the device location between mobile phone towers and public masts (e.g., assistive GPS), a Wi-Fi connection location unit, a WHOIS unit (e.g., performed on IP address or MAC address), a GSM/CDMA cell identifier, a self-reporting location information, or any other suitable location module.

The method is preferably performed in whole or in part by the ECU of the system 200, but may alternatively be performed by a native application a user device, a server, by a browser application a user device, or by any other suitable apparatus. The user device is preferably a mobile device associated with the user, including mobile phones, laptops, smartphones, tablets, or any other suitable mobile device. The user device is preferably connected to the server, wherein the connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device may additionally or alternatively function as the server, such as in a distributed network system. The method may be performed by one or more servers, wherein the servers may be stateless, stateful, or have any other suitable configuration or property.

Blocks of the method 100 can, in variations, be implemented as a plurality of modules and/or portions thereof, wherein the plurality of modules are implemented at a computing system (e.g., an ECU, a mobile device, an alternative computing system associated with the vehicle, etc.). Each module of the plurality may utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), vehicle and/or system model-based algorithms and artificial intelligence/machine learning, and any other suitable learning style. Each module may additionally or alternatively be a: probabilistic module, heuristic module, deterministic module, or be any other suitable module leveraging any other suitable computation method, machine learning method, or combination thereof.

Each module may be validated, verified, reinforced, calibrated, or otherwise updated based on newly received, up-to-date measurements; past measurements recorded during the operating session; historic measurements recorded during past operating sessions; or be updated based on any other suitable data. Each module may be run or updated: once; at a predetermined frequency; every time the method is performed; every time an unanticipated measurement value is received; or at any other suitable frequency. The set of modules may be run or updated concurrently with one or more other modules, serially, at varying frequencies, or at any other suitable time. Each module may be validated, verified, reinforced, calibrated, or otherwise updated based on newly received, up-to-date data; past data or be updated based on any other suitable data. The module may store data that is downloadable through service devices during service or by a wireless network device (e.g., when telematic connectivity is established). Each module may be run or updated: in response to determination of an actual result differing from an expected result; or at any other suitable frequency.

Conventional suspension systems suffer from several drawbacks. First, pressure regulators are oftentimes set to fully-loaded pressure, and not optimized for partial load. Second, when the vehicle includes lift axles, lift axle actuation (e.g., lifting, deployment) is often manually performed, which relies on the driver to remember to deploy and/or lift the axle. Third, because lift axle actuation is manual, lift axle deployment and/or lifting may be inconsistent between drivers, and lift axle deployment and/or lifting may require drivers to dynamical interpret and respond to road, route, and/or load conditions that suggest lift axle deployment and/or lifting (e.g., performing a turn). Fourth, conventional pneumatic height control systems are designed with response delays to reduce air consumption and improve fuel economy—this delayed control response slows the vehicles ability to fully lift axles. Fifth, some vehicles lack adjustable suspension altogether, and therefore suffer from asymmetric axle loading.

Variations of the method 100 and/or system 200 may afford several benefits and/or advantages.

First, variants of the system enable automated suspension adjustment and/or lift axle deployment, resulting in increased regulatory compliance, gas consumption optimization, and vehicle performance. Second, variants of this system and method enables a facile way for users (e.g., first-time users, novice users, etc.) to compliantly load their vehicles by instructing the users on how to adjust the load within the vehicle (e.g., arrange the load) in real- or near-real time and/or by dynamical adjusting the vehicle support structure (e.g., tires, suspension, tongue jack, etc.) to accommodate the load imbalance. However, the system and method may confer any suitable set of benefits.

In a first example, the method may enable a lay-driver (e.g., a non-professional driver) of a hauling vehicle (e.g., a vehicle used for moving cargo such as a tractor-trailer, a recreational vehicle, a central-axle towed trailer and towing vehicle, etc.) to avoid improper load arrangement by measuring the load arrangement during and after vehicle loading and providing instructions to the lay-driver including how to achieve the proper load arrangement.

In a second example, the method may enable a commercial truck driver to maximize the efficiency of the distribution of the vehicle load during loading. For example, the method may include providing real-time updates of the load weight borne by each axle to the driver during loading, such that limitations regarding total weight and per-axle weight along the truck driver's planned route are adhered to. In another example, the method may include maintaining the trailer in a level configuration during loading of discrete load units (e.g., pallets) by automatically actuating the air suspension system in response to dynamical-changing load distribution within the cargo compartment, which may prevent discrete load units from sliding, rolling, or otherwise moving within the cargo compartment during loading.

Second, variants of the system and method can: enable better driver focus, maximize load on drive axles for improved traction, reduce tire wear, improve fuel economy, diagnose and/or anticipate maintenance or configuration, and improve regulatory compliance (e.g., bridge law compliance across one or more geographic regions), all by way of automating lift-axle deployment and/or otherwise controlling the fluid suspension system of the vehicle.

Third, variants of the system and method may estimate the performance quality characteristics (e.g., health, wear, etc.) of system components (e.g., tires, fluid springs, fluid jacks, etc.) to be monitored and reported to a user or other entity associated with the vehicle. The system may use acceleration data to better estimate component wear—for example, a curb-strike event may be logged and used as historical data to better estimate life for suspension bushings that have to react that lateral impact load. Multiple curb strikes would degrade those bushings components life more than shock absorbers in this example. An algorithm may be crafted to optimize wear across all axles, where the decision to lift or deploy may be based on distributing wear. This may allow a vehicle to be operated in service longer, extending service intervals and increasing uptime. These characteristics may also enable the vehicle and/or components to be serviced (e.g., repaired, replaced) prior to failures or other undesirable component performance degradation. For example, variants of the system and method can: sense temperature (e.g., internal temperature, fluid temperature, housing temperature) of components to determine a history of thermal cycling associated with the components; sense vertical acceleration and pressure fluctuation and determine rough and/or smooth road operation history; sense pressure in suspension elements (e.g., springs, tires) to determine load variation over time; and use the aforementioned characteristics (e.g., in combination with data from component manufacturers) to estimate the remaining life of the components (e.g., tires, air springs, dampers, bushings, etc.) and report the remaining component life to a user or other entity responsible for vehicle system maintenance.

However, variations of the method and/or system may additionally or alternatively afford any other suitable advantages and/or benefits.

In a specific example, a truck having a controllable air suspension system may follow a route defined by a series of map coordinates (e.g., determined by a GPS). The computing system controlling the air suspension system determines (e.g., via the map coordinates) that the truck has arrived at and/or will imminently arrive at an intersection, and that the truck will need to execute a turn (e.g., a turn through a subtended angle greater than a threshold angle, a turn of a sharpness exceeding a threshold sharpness, any other turn, etc.) that may require lifting of the lift axle(s). The method may include automatically lifting the lift axles in preparation for the turn. In a related specific example, the method may include determining that the truck is arriving at a loading/unloading depot or other destination at which maneuvering for trailer/load drop-off will likely be performed, and automatically lifting the lift axle(s) in preparation for maneuvering, and/or automatically adjusting the vehicle ride height (e.g., using load data gathered from air springs and/or jacks to inform the operator how to optimize the distribution of the existing or future vehicle load).

In another specific example, the method may include automatically changing ride height in response to terrain data associated with a planned route in real- or near-real time. It may be desirable for trucks (e.g., autonomous and/or platooning trucks) to travel at the lowest possible ride height for maximum aerodynamical efficiency, while simultaneously allowing adequate suspension travel to not bottom out over rough and/or highly variable terrain. The method may include determining terrain roughness (e.g., based on known terrain features along the vehicle route), and automatically increasing ride height in regions of the planned route including rough terrain. In a related example including a plurality of trucks arranged in a platoon, the lead truck experiences (e.g., detects) features of the terrain first, and the method may thus include communicating the terrain features to following vehicles in the platoon, and automatically adjusting ride height(s) of following vehicles accordingly. In this example, the method may also include providing terrain data to autonomous route and platoon controllers (e.g., teleoperators, remote servers, etc.), and gathering the terrain data using sensors of the air suspension system (e.g., ride height, pressure, and/or accelerometer sensors). The method may also include providing the terrain data to navigation products (e.g., Waze, Google Maps, etc.) to allow roadway users to be informed of terrain features along users' routes, and, in cases wherein the users' vehicles include controllable suspension systems, automatically adjusting the users' vehicle ride height(s) to avoid obstacles or otherwise suitably adapt the suspension to terrain features.

In another specific example, the method may include automatically optimizing lift axle deployment and suspension height based on real-time conditions during driving (e.g., terrain conditions, weather conditions, etc.). Based on the planned route (e.g., retrieved from a database, determined from the onboard GPS-enabled computing system, etc.), in combination with weather data along the planned route (e.g., retrieved from a weather forecast database, measured using onboard weather sensors, etc.), the method may include optimizing (e.g., by actuating the air suspension system) vehicle height and/or loading on the lift axles and drive axles. In a specific implementation, the weather data may include an indication of icy conditions, and the method may include increasing the percentage of the load borne by the driven axle (e.g., by increasing the stiffness of the suspension supporting the driven axle relative to the stiffness of the suspension supporting the non-driven axle) to enhance traction at the tires of the driven axle. In another specific implementation, the weather data may include an indication of snowy conditions, and the method may include equalizing load across all axles (e.g., driven and non-driven axles) to improve vehicle stability in high-speed (e.g., a range of highway speeds in the United States, 45-75 m.p.h., any suitable speeds, etc.) and snowy conditions. In related specific implementations, the method may include actively adjusting the relative stiffness of the air suspension at each axle and/or fully- or partially-lifting liftable axles (e.g., lift axles) for any suitable purpose, such as: to improve fuel econ by transferring more load to lift axles having low rolling resistance tires, to improve suspension articulation over rough terrain by fully lifting the lift axles, etc.

In another specific example, the method may include monitoring the vehicle level (e.g., whether the vehicle is level relative to a gravity vector, the number of degrees out of level the base of the vehicle cargo compartment is, etc.) at an on-board level sensor (e.g., bubble level, digital level, accelerometer, suspension height sensors that measure the angular difference between the road plane and vehicle body plane, etc.). The direction of the net force on various portions of the load (e.g., load vectors) may shift in cases wherein the vehicle is not level, and thus the method (e.g., implemented at a control system) may include determining the vehicle level and reporting the load vector(s) to a user and/or dynamical controlling the suspension system based on the load vector(s)(e.g., in order to adjust the load vectors, maintain the load vectors, etc.).

In some configurations, trailers may be loaded when disconnected from a tow vehicle (e.g., a tractor, a pickup truck, etc.) and it may still be desirable to monitor the load distribution and inform operators of optimal load distribution and recommended steps to achieve optimal load distribution. In such configurations, the method may include monitoring and control of trailer support(s) (e.g., landing gear, tongue jack, etc.) that are driven by compressed fluid (e.g., a pneumatic air spring or hydraulic actuator). Such support(s) may be considered part of the vehicle suspension (e.g., the air suspension system of the vehicle).

As described above, the method 100 for vehicle load management includes: determining a vehicle condition parameter S110; determining an existing state of a vehicle suspension system S120; determining a desired state of the vehicle suspension system based on the vehicle condition parameter S130; and transforming the existing state of the vehicle suspension system into the desired state of the vehicle suspension system S140. All or portions of the method are preferably performed by the ECU, but may alternatively be performed by the vehicle, a user device (e.g., smartphone), a remote computing system (e.g., server system), or by any other suitable system. The method may be performed upon trigger event detection (e.g., detecting door unlatching, vehicle power-on, vehicle motion, suspension loading or unloading, manual selection of a button or icon, or any other suitable trigger event), periodically, before, during, and/or after vehicle loading, or at any suitable time.

Load arrangements preferably describe (e.g., include data indicative of) the mass (weight) of the load as a function of the position within the cargo compartment of a vehicle, and may describe the function at any suitable resolution (e.g., a continuous function of position, a discretized function of position corresponding to the position of each suspension element, a binary function divided into 'fore' and 'aft' positions, a coordinate mapping of load portions to load positions, etc.).

Block S110 includes: determining a vehicle condition parameter, which functions to determine data pertaining to the condition of the vehicle that is germane to vehicle load management, for use as input(s) to subsequent block(s) of the method 100. The vehicle condition parameter may include: the total weight of the load within the vehicle, the total weight of the load to be loaded into the vehicle (e.g., outside the vehicle), the arrangement of the load within the vehicle (e.g., the weight as a function of position within a cargo compartment or other lumen of the vehicle), the suspension operating ranges (e.g., minimum and maximum pressures in each air spring, minimum and maximum travel of each suspension element, etc.), operating ranges of other components (e.g., minimum and maximum internal tire pressures, maximum load per axle), a planned route of the vehicle (e.g., the set of geographic locations that the vehicle will traverse between its origin and destination), a geographic location of the vehicle, traffic conditions (e.g., speed limits, actual traffic speed, roadway weight limits, roadway axle limits, etc.) associated with the vehicle's location and/or planned route, weather conditions (e.g., rain, sleet, snow, ice, wind, heat, etc.) associated with the vehicle location and/or planned route, terrain features (e.g., roadway banking angles, road surface quality, potholes, speedbumps, etc.) associated with the vehicle location and/or planned route, physical models of vehicle operation (e.g., dynamical models of the systemic response of the vehicle based on load distribution within the vehicle during vehicle operation and maneuvering), and any other suitable parameters. Vehicle condition parameters may additionally or alternatively include any suitable combination(s) of the aforementioned parameters. The vehicle condition parameter(s) may be a dataset, a single parameter value, a set of parameter values, or have any other suitable data structure. The vehicle condition parameters may be determined using: vehicle sensors (e.g., pressure sensors coupled to the internal fluid reservoirs of each element of a fluid suspension system, height sensors that detect the ride height of the vehicle, strain gauges, accelerometers, vibrometers. GPS sensors, etc.), user input mechanisms (e.g., a user interface, a touch screen communicatively coupled to the ECU, a mobile device associated with the user and communicatively coupled to the ECU, etc.), a remote computing system (e.g., a remote database from which vehicle condition parameters may be received at the vehicle), an onboard algorithm (e.g., executing at the ECU, executing at an alternative computing system of the vehicle, etc.), and by any other suitable mechanism.

In specific examples, Block S110 may include receiving the vehicle condition parameter at the ECU. In one example, the vehicle condition parameter includes data that correlates fluid spring pressure to load (e.g., a lookup table, a function relating pressure to load, etc.). In another example, the vehicle condition parameter includes a calibration dataset that includes the baseline pressures of various elements of the fluid suspension system when the vehicle is unloaded (e.g., for use in determining added load during loading). In another example, the vehicle condition parameter includes the number of axles of the vehicle. In another example, the vehicle condition parameter includes the vehicle identification number (VIN), and the method includes retrieving vehicle data (e.g., additional vehicle condition parameters) using the VIN (e.g., from a lookup table). However, Block S110 may include receiving and/or determining any other suitable intrinsic and/or extrinsic parameters associated with the vehicle.

Block S110 may include Block S111, which includes: determining a set of loading criteria. Block S111 functions to determine a set of criteria which should be met by the load distribution within the cargo compartment of the vehicle, for use in determining the desired state of the vehicle suspension system (e.g., Block S130). The loading criteria may be calculated, selected, retrieved, or otherwise determined. The loading criteria may be determined based on: the vehicle make and/or model, the driver, vehicle operation history (e.g., age, wear, etc.), the geographic route, the weather (e.g., current, predicted), wear component parameters (e.g., tire age, tread wear, etc.), suspension type, system pressure, or any other suitable parameter. The loading criteria may include: a weight distribution per axle, a weight limit per axle, the loading frequency, the loading order (e.g., back-to-front, left-to-right), or any other suitable loading criteria. The loading criteria may be determined by the ECU, retrieved from a remote computing system (e.g., directly, using a user device as an intermediary, etc.), or otherwise determined. In a first example, determining the set of loading criteria includes receiving weight-limit data associated with each axle of the vehicle (e.g., of a set of axles of the vehicle). In a related example, the set of loading criteria may be associated with a geographic location of the vehicle (e.g., loading criteria associated with a regulatory code in effect in the geographic location of the vehicle). In another related example, the set of loading criteria may be associated with a planned route of the vehicle (e.g., routes including a total weight limit, a weight-per-axle limit, etc.).

Figure 4:
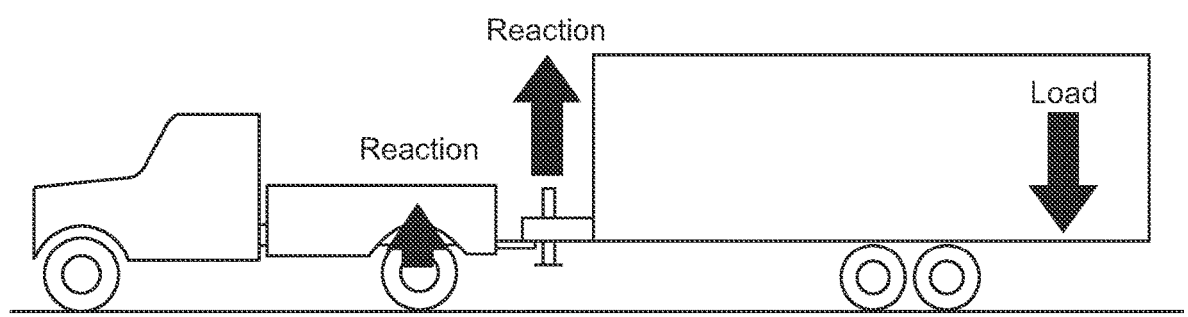
FIG. 4 is an illustration of reaction forces due to a possible overloaded configuration in a vehicle according to the principles of the present disclosure.

A variation of Block S111 includes determining a dynamical model of vehicle operation. The dynamical model is preferably based at least in part on characteristics of the vehicle load (e.g., load arrangement, total weight, etc.). The dynamical model is preferably a kinematic model, but may alternatively or additionally include: an optimization equation, a set of rules mapping a load weight at each position within a cargo compartment of the vehicle to a steering responsiveness or other vehicle operation characteristic, an operating envelope of the vehicle (e.g., the set of vehicle condition parameters in which the vehicle may operate in a desirable or controllable manner), and any other suitable physical model for vehicle operation. For example, the dynamical model of vehicle operation may be based on the arrangement of the vehicle load within the cargo compartment. The arrangement of the vehicle load may impact handling characteristics of the vehicle; for example, as shown in FIG. 4, a load oriented towards the rear of a trailer may lead to an upward force on the rear wheels of the towing vehicle and reduce traction and/or performance, particularly in cases wherein the rear wheels of the towing vehicle are drive wheels. The dynamical model may be determined (e.g., selected, calculated, learned, etc.) based on: the vehicle type, the driver or operator, the route (e.g., terrain, operations required along the route), the weather (e.g., current, predicted, historic, etc.), the weight of the load in the vehicle, the arrangement of the load in the vehicle, or otherwise determined. The dynamical model may output: a second load arrangement (e.g., preferred load arrangement, optimal load arrangement), a binary output (e.g., go/no-go) indicative of whether the vehicle may be desirably operated, guidance to the user for how to arrange the load to bring vehicle operating parameters into desirable ranges (e.g., related to steering responsiveness, braking responsiveness, jack-knifing avoidance, etc.), or any other suitable output. The dynamical model may be structured and/or implemented as: a neural network, an optimization equation, a discretized model, or any other suitable structure.

Block S110 may include Block S112, which includes: determining a contextual dataset. Block S112 functions to determine parameters related to the context of vehicle operation. The contextual dataset may include: any of the vehicle condition parameters described above, historical data related to the vehicle (e.g., maintenance records, performance history, etc.), data pertaining to the physical surroundings of the vehicle (e.g., positions of surrounding vehicles or roadway features relative to the vehicle, traffic characteristics in the region local to the vehicle, light levels surrounding the vehicle, proximity of pedestrians to the vehicle, etc.), and any other suitable data related to the context of the vehicle. Block S112 is preferably performed in substantially real-time, but may additionally or alternatively be performed asynchronously, based on an arbitrary delay, in response to a trigger, or at any other suitable time point or period. The contextual dataset may be determined by sensors onboard the vehicle (e.g., as described above), received from a user (e.g., as described above), and otherwise suitably determined. Block S112 is preferably performed during vehicle operation, which may include locomotion (e.g., driving of the vehicle), loading of the vehicle, and/or any other suitable vehicle state. The contextual dataset may be determined based on: a planned route of the vehicle, the location of the vehicle, the operation of the vehicle (e.g., dynamical changing handling characteristics of the vehicle, increasing or decreasing haptic or aural feedback to the user during vehicle operation, etc.), and any other suitable basis.

A variation of Block S112 includes: determining the contextual dataset based on a planned route of the vehicle and terrain features associated with the planned route. In this variation, the contextual dataset preferably includes an anticipated terrain feature (e.g., a banked roadway, a turn, etc.).

Block S120 includes: determining an existing state of the vehicle suspension system, which functions to establish the baseline status of the vehicle load distribution for use in determining transformation in subsequent Block(s) of the method 100. The state of the vehicle suspension system preferably includes the instantaneous force supplied by each suspension element (e.g., air spring, air jack, etc.) in the suspension system, and the mechanical work required to supply the force, such that the characteristics of the load supported by the suspension system may be determined based on the force and/or work. However, the state of the vehicle suspension system may additionally or alternatively include: data based on the aforementioned force(s) and/or work values, the load distribution among the suspension elements (e.g., air springs) of the suspension system, a binary indication of whether the vehicle is loaded or unloaded (e.g., whether a cargo load has been loaded into the vehicle, unloaded from the vehicle, etc.), the stiffness of the suspension system (e.g., the stiffness of each air spring, the pressure at each air spring required to maintain the stiffness, etc.), whether the suspension system is in an active or inactive state (e.g., whether air is being actively compressed in the air suspension system), and any other suitable data related to the state of the vehicle suspension system. Block S120 may be performed by: the ECU, the fluid suspension system, pressure sensors within the pressure manifolds, the vehicle, or by any suitable system. In variations, Block S120 may be performed upon trigger event detection, periodically, asynchronously, and/or with any other suitable temporal characteristics. Trigger events may include: crossing of a virtual geofence (e.g., along a vehicle route), an output of a vehicle sensor exceeding a threshold value (or tailing below a threshold value, or falling outside a predetermined range of values), receiving a user input, and any other suitable event.

Block S120 may include Block S121, which includes: sampling, at a manifold of the fluid suspension system of the vehicle during vehicle loading, a set of fluid pressures corresponding to a set of fluid springs of the fluid suspension system. Block S121 functions to directly measure the system pressure in the fluid springs (e.g., air springs, pneumatic actuators, hydraulic springs, actuators, etc.) supporting the vehicle load, and thereby determine the load (e.g., weight) supported by each spring and the total load weight in the cargo compartment of the vehicle. The fluid springs supporting the vehicle load may include: vehicle suspension springs, the tongue jack (e.g., controlling a mounting height of an RV or trailer to a tow vehicle), air springs, air jacks, landing gear extended or retracted by a fluid spring or jack, the air bladders (e.g., inner tubes) of vehicle tires, or be any suitable set of fluid springs.

Block S120 may include Block S122, which includes: determining a first load arrangement based on the set of fluid pressures, which functions to determine how the cargo (e.g., load, mass) is distributed within the trailer. In one variation, the first load arrangement includes a coordinate mapping between a first discrete portion of the vehicle load and a first location within a cargo compartment of the vehicle. Block S122 functions to compute the distribution of the load within the cargo compartment based on the fluid pressures at points distributed around the vehicle chassis (e.g., between the cargo compartment and the axles of the vehicle). In this variation, each fluid manifold and/or pressure sensor is mapped to a predetermined vehicle position (e.g., trailer position), wherein the mass for each trailer position may be calculated from the respective pressure sensor measurement. In a second variation, the first load arrangement is determined by recording a set of exterior images of the loaded vehicle. The relative suspension heights may be determined from the distance between the wheel and the wheel well (e.g., extracted from the image using segmentation, feature detection, or other computer vision techniques), the load's mass may be determined based on the change in suspension height, and the load distribution may be determined based on the relative heights of the suspension elements. However, the load arrangement may be otherwise determined.

Block S120 may include Block S123, which includes: determining an existing stiffness distribution, the existing stiffness distribution comprising a stiffness value associated with each of the set of fluid springs, based on the set of fluid pressures. Block S123 functions to compute the effect of the load within the cargo compartment in the form of the spring stiffness, which is an adjustable function of the controlled fluid pressure in each spring. Block S123 may be performed by sampling the pressure at each air spring (e.g., at a reservoir port of each air spring, at a pressure line coupled to each air spring, at a manifold coupled to each air spring, etc.), and correlating the sampled pressure to a spring stiffness (e.g., via a lookup table stored at a database). The stiffness value is preferably a spring constant (e.g., an adjustable spring constant) associated with the suspension element (e.g., the air spring); however, the stiffness value may include any related dynamical parameter governing suspension element operation (e.g., damper setting, dashpot resistance, intrinsic stiffness, etc.). The stiffness distribution is preferably correlated to the load distribution within the cargo compartment of the vehicle (e.g., the stiffness is correlated to the internal pressure of the fluid spring, which is correlated to the load distribution); however, in variations, the stiffness distribution may be independent of the load distribution and may be independently set (e.g., via the controllable manifold). However, Block S123 may be otherwise suitably performed.

Block S130 includes: determining a desired state of the vehicle suspension system, which functions to identify the state of the vehicle suspension system required to achieve a criterion or criteria that are based on the vehicle condition parameter. The desired state of the vehicle suspension system may be defined as above in relation to the existing state of the vehicle suspension system, and in any other suitable manner. The desired state is preferably determined based on the vehicle condition parameter (e.g., as described above), but may additionally or alternatively be determined based on the set of loading criteria, a contextual dataset, and/or any other suitable basis. The desired state is preferably determined by the ECU, but may additionally or alternatively be determined by any suitable computing system and/or user associated with the vehicle. In some variations, the desired state of the vehicle suspension system is identical to the existing state of the vehicle suspension system (e.g., the existing and desired load arrangements are the same, the existing and desired stiffness distributions are the same, etc.); in such cases, transforming the existing state of the vehicle suspension system into the desired state of the vehicle suspension system may include passively maintaining the vehicle suspension system in the existing state, or otherwise providing for the suspension state to be maintained (e.g., providing loading instructions to the user that include retaining the existing configuration, arrangement, and/or distribution of the load, etc.).

Block S130 may include Block S131, which includes: determining a second load arrangement based on the set of loading criteria. The second load arrangement may include a second coordinate mapping between a second discrete portion of the vehicle load and a second location within the cargo compartment of the vehicle. Block S131 functions to identify an arrangement for the load within the vehicle that satisfies the set of loading criteria. For example, in cases wherein the set of loading criteria includes a maximum weight borne by each axle, Block S131 may include determining an arrangement of the load (which may be different from or identical to the first arrangement) that results in a load distribution that does not exceed the maximum weight borne by each axle. However, Block S131 may additionally or alternatively include determining the second load arrangement based on the set of loading criteria in any other suitable manner.

A variation of Block S131 includes calculating the second load arrangement using the dynamical model (e.g., determined in Block S111). In this variation, the first load location (e.g., determined in Block S122) is an input to the dynamical model.

In a specific example of Blocks S121 and S131, determining the second load arrangement includes determining a new location for the first discrete portion of the vehicle load (e.g., rearranging the first discrete portion of the vehicle load, the first discrete portion of the vehicle load and the second discrete portion are the same portion of the vehicle load, etc.).

Block S130 may include Block S132, which includes: determining a desired stiffness distribution. Block S132 functions to determine a stiffness value associated with each suspension element (e.g., air spring) that corresponds to the desired state of the suspension system. Block S132 may be performed based on the contextual dataset, the set of loading criteria, any other vehicle condition parameter, and any other suitable basis. The desired stiffness distribution is preferably the set of stiffness values thus determined, but may additionally or alternatively be a set of pressures (e.g., which correspond to stiffness values of the air springs thus pressurized), a range of stiffness values associated with each suspension element with any suitable correspondence (e.g., one to one, one to many, etc.), and otherwise suitably defined. The desired stiffness distribution is preferably determined by the ECU as a component of determining the desired state of the vehicle suspension system, but may be otherwise suitably determined. The desired stiffness distribution may be determined in order to affect (e.g., maintain, achieve, etc.) a related parameter of the suspension system; for example, the desired stiffness distribution may be determined (e.g., chosen, computed) to maintain the height and/or flatness of the vehicle during loading (e.g., by raising and/or stiffening springs supporting heavier portions of the load relative to other springs to prevent sagging). Block S132 is preferably performed in substantially real time during vehicle operation (e.g., loading, driving, etc.), but may additionally or alternatively be performed periodically (e.g., every minute, every 15 seconds, etc.), asynchronously, based on a trigger event (e.g., an additional portion of the load being added to the cargo compartment), or with any other suitable temporal characteristics.

Block S140 includes: transforming the existing state of the vehicle suspension system into the desired state of the vehicle suspension system, which functions to realize the desired vehicle load distribution and/or arrangement. Block S140 is preferably performed immediately subsequent and in response to Block S130, but may additionally or alternatively be performed at any other suitable time in response to any other suitable event (e.g., a trigger event, a user input, etc.).

Block S140 may include Block S141, which includes: determining a loading instruction set. Block S141 functions to generate a set of instructions that describe how to modify the load to achieve the desired state of the suspension system (e.g., corresponding to a desired load distribution, a desired stiffness distribution, etc.). In one variation, Block S141 may be based on the desired load arrangement. For example, the loading instruction set may include a set of verbal instructions guiding the user towards rearranging the vehicle load in order to achieve the desired load arrangement. Block S141 is preferably performed at the ECU, but may additionally or alternatively be performed using any other suitable computing system.

Block S140 may include Block S142, which includes: providing the loading instruction set to a user of the vehicle. Block S142 functions to provide the instruction set determined in Block S141 to the user, so that the user may take action according to the instruction set to achieve the desired state of the suspension system.

In an example implementation, Blocks S141 and S142 may include generating the instruction set at the ECU, and transmitting the instruction set to a mobile device of the user. In another example, Blocks S141 and S142 may include receiving pressure measurements from the ECU at a processing system (e.g., a mobile device, a vehicle computing system, a remote computing system), generating the instruction set at the processing system, and transmitting the instruction set to the user (e.g., at a display or interface of the processing system, at a mobile device associated with the user, etc.). However, Blocks S141 and S142 may be otherwise suitably performed.

Block S140 may include Block S143, which includes: automatically controlling the set of fluid springs at the plurality of actuation points based on the desired stiffness distribution, wherein controlling the set of fluid springs may include setting the stiffness value of the fluid spring associated with each of the plurality of actuation points. The actuation points are preferably the physical locations on the vehicle at which the fluid suspension elements (e.g., fluid springs) apply force to the axles and chassis of the vehicle to provide suspension of the vehicle, but may be otherwise suitably defined. Block S143 functions to directly adjust the pressure at the fluid springs (e.g., each fluid spring individually) to control the height and/or stiffness of the suspension system at each actuation point. Block S143 may be performed concurrently (e.g., simultaneously, contemporaneously, etc.) with measurement of the existing state of the suspension system and/or with loading and unloading of the vehicle, at high frequency (e.g., once per 500 ms), at low frequency (e.g., once per minute), at an adjustable periodic frequency or with any other suitable temporal characteristic. In another variation, Block S143 may be performed, a user instruction may be received, and Block S143 may be performed again based on the user instruction. Block S143 is preferably performed by the ECU, but may additionally or alternatively be performed by any other suitable computing system (e.g., a native application executing at a mobile device of the user). In a specific example, Block S143 may include compressing the fluid, pumping the compressed fluid along a pressurized fluid line into a fluid spring, and thus increasing the pressure in the fluid spring and thereby increasing the stiffness of the fluid spring. In this specific example, Block S143 may include achieving a set pressure point via a closed loop control mechanism (e.g., wherein the measured pressure in the fluid spring is the input to the control loop).

In a specific example, Block S143 includes: actuating the set of fluid springs in response to placement of at least one of the first load portion and the second load portion within the cargo compartment, wherein actuating the set of fluid springs minimizes an angular difference between a vector normal to a base of the cargo compartment and a gravity vector (e.g., levels the cargo compartment).

In another specific example, Block S143 includes: automatically controlling the set of fluid springs in response to an anticipated terrain feature (e.g., determined in Block S112) along the vehicle route. In this example, Block S143 may include setting a first stiffness value of a first subset of the plurality of actuation points at a first side of the vehicle, and setting a second stiffness value of a second subset of the plurality of actuation point at a second side of the vehicle opposing the first side (e.g., in anticipation of terrain feature including a banked turn).

The method may include Block S150, which includes: generating feedback for the user during loading. Block S150 functions to inform an entity loading the vehicle (e.g., the user) of the instantaneous status of the vehicle load distribution, such that the entity may act to load the vehicle according to the desired load distribution in real-time (e.g., substantially real time). The feedback is preferably generated based on the output of Block S120 and/or S130 (e.g., a state of the suspension system and the correlated arrangement of the load within the vehicle), but may additionally or alternatively be based on vehicle condition parameters, a loading instruction set (e.g., determined in Block S141), and/or any other suitable basis. The feedback is preferably generated by the ECU, but may additionally or alternatively be generated by any other suitable computing system. The feedback is preferably displayed to the user (e.g., at a graphical user interface) in real- or near-real time during vehicle operation (e.g., loading). For example, Block S150 may include displaying a graphical representation of the vehicle and the load distribution within the vehicle, and highlighting portions of the vehicle where the load does not satisfy a set of loading criteria (e.g., exceeds a maximum weight corresponding to the axle bearing the load located at the highlighted portion). However, Block S150 may additionally or alternatively include generating feedback in any other suitable manner.

Figure 6A:
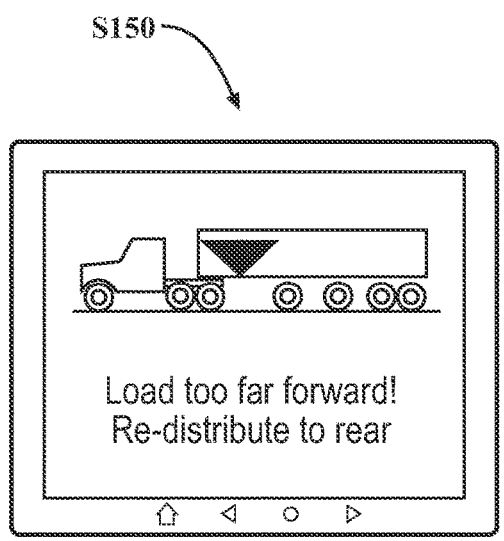
FIGS. 6A-B depict example renderings in accordance with a portion of an example of the method according to the principles of the present disclosure.
Figure 6B:
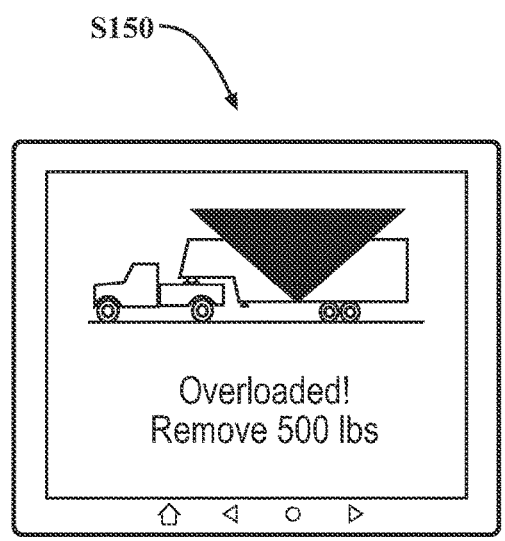

In one variation, Block S150 includes: providing a notification to a user of the vehicle. The notification may include any suitable information related to the vehicle loading, including: a fraction of the vehicle load supported by each of the fluid springs of the set of fluid springs, an indication that the load is improperly arranged and instructions for remediation (e.g., as shown in FIG. 6A), a warning that the vehicle is overloaded (e.g., as shown in FIG. 6B), and any other suitable load-related data or information. In a related variation, Block S150 further includes: graphically rendering the notification at a device associated with the user; receiving input from the user at the device; and actuating the set of fluid springs based on the input. Block S150 may additionally or alternatively include receiving input from the user at an interface (e.g., an override switch, a dashboard console, etc.) and actuating the suspension system (or ceasing actuation) in response to the input at the interface.

In another variation, Block S150 includes: monitoring, in substantially real-time, the set of pressure values during vehicle loading, determining a real-time load arrangement, and generating a comparison between the real-time load arrangement and the second load arrangement. In this variation, Block S ISO further includes providing a notification to the user based on the comparison. In an example, the notification indicates a degree of user compliance with the loading instruction set. In another example, Block S150 may include providing an overload alert (e.g., via a dashboard indicator) when a load is detected that exceeds the maximum load supportable by the primary suspension and/or the primary suspension in combination with the lift axle(s).

The method may include Block S160, which includes: automatically deploying, using the fluid suspension system, a lift axle (e.g., drop axle) based on the satisfaction of a deployment criterion. Block S160 functions to increase the number of axles bearing the vehicle load and/or increase the load borne by the lift axle(s). The deployment criterion may include any condition that indicates additional load-bearing axles are desirable, such as: the total load weight exceeding a threshold value, a permitted number of axles corresponding to the geographic location of the vehicle exceeding the existing number of deployed axles, and any other suitable condition. In a specific example, Block S160 includes increasing the fluid pressure (e.g., using the ECU-controlled manifold) in one or more fluid-driven jacks that drive the lift axle away from the vehicle undercarriage and into contact with the ground, and continuing to increase the fluid pressure until the lift axle is bearing the desirable fraction of the vehicle load weight (e.g., based on the measured pressure of the fluid-driven jacks in combination with the measured pressure of other suspension elements). In another specific example, Block S160 includes using a first fluid-driven suspension element (or set of such elements) to deploy the axle (e.g., move the axle into contact with the ground), and a second fluid-driven suspension element (or set of such elements) to adjust the load borne by the lift axle(s) (e.g., increase the fluid pressure until the axle is bearing the desirable fraction of the vehicle load weight).

In a variation of Block S160, the deployment criterion includes the desired stiffness distribution including a stiffness value exceeding a threshold stiffness value (e.g., corresponding to one of the fluid springs).

The method may include Block S170, which includes: automatically retracting, using the fluid suspension system, a lift axle (e.g., drop axle) based on the satisfaction of a retraction criterion. Block S170 functions to decrease the number of load bearing axles and/or reduce the load borne by the lift axle(s). The retraction criterion may include any condition that indicates fewer load-bearing axles are desirable, such as: the total load weight is beneath a threshold value, the existing number of deployed axles exceeding a permitted number of axles corresponding to the geographic location of the vehicle, additional fuel economy is desirable and additional load bearing is not required, weather conditions indicate increased traction (e.g., at the drive axle) is desirable, and any other suitable condition. In a specific example, Block S160 includes decreasing the fluid pressure (e.g., using the ECU-controlled manifold) in one or more fluid-driven jacks that drive the lift axle away from contact with the ground and toward the vehicle undercarriage, and continuing to decrease the fluid pressure until the lift axle is bearing the desirable fraction of the vehicle load weight (e.g., based on the measured pressure of the fluid-driven jacks in combination with the measured pressure of other suspension elements). In another specific example, Block S170 includes using a first fluid-driven suspension element (or set of such elements) to retract the axle (e.g., move the axle away from contact with the ground), and a second fluid-driven suspension element (or set of such elements) to adjust the load borne by the lift axle(s) (e.g., decrease the fluid pressure until the axle is bearing the desirable fraction of the vehicle load weight).

In a variation of Block S170, the retraction criterion comprises a planned route of the vehicle including a turn exceeding a threshold turn angle. In this variation, automatically retracting the drop axle is performed within a time period proximal to and preceding a time point at which the turn is made by the vehicle.

Figure 7:
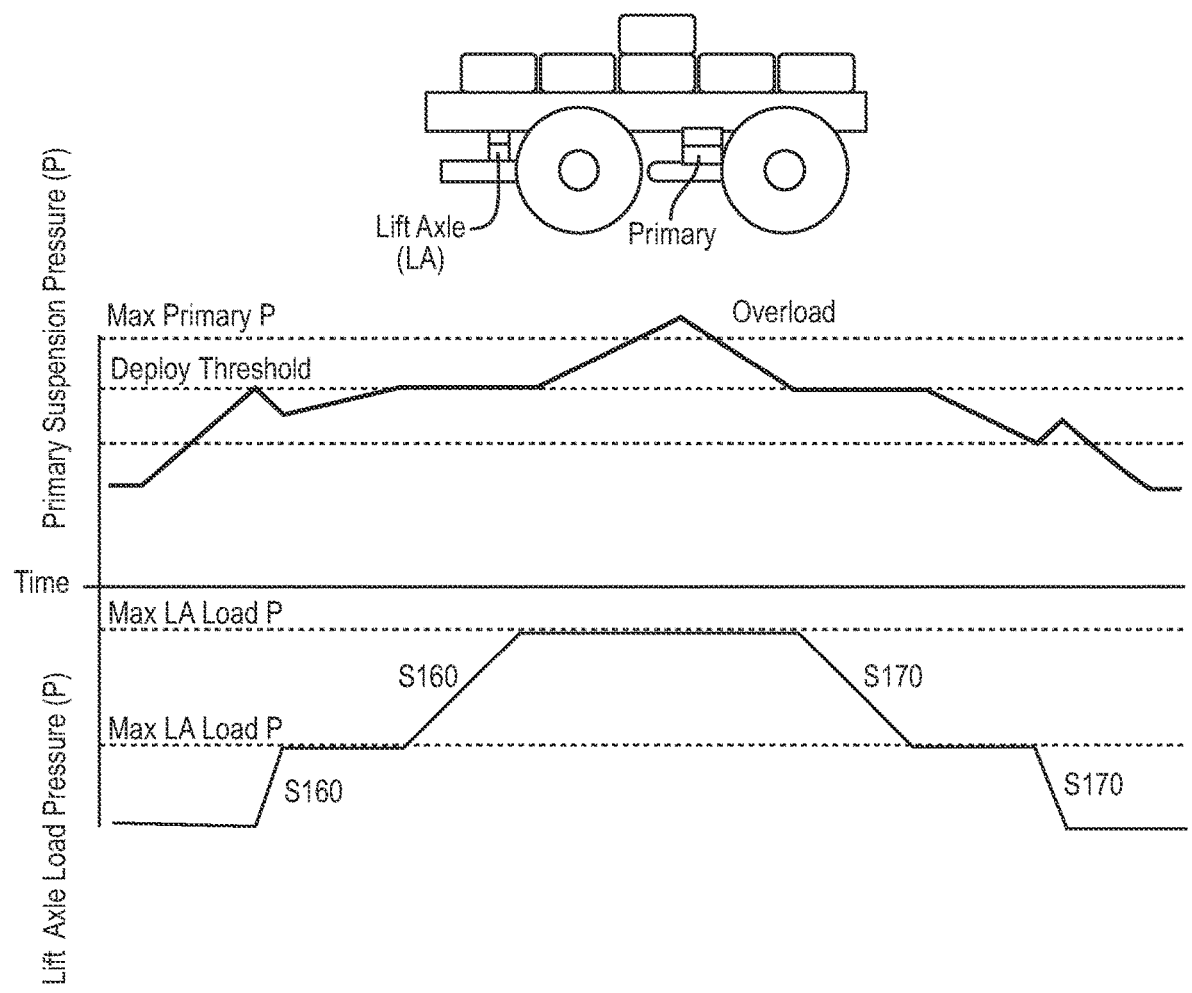
FIG. 7 depicts an example time series of suspension pressures in accordance with an example implementation of a variant of the method according to the principles of the present disclosure.

Blocks S160 and S170 may be performed synchronously (e.g., alternating increasing and decreasing the pressure at the lift axle) to maintain a desired difference in load between the primary suspension (e.g., suspension of the non-liftable axles, the drive axles, etc.) and the secondary suspension (e.g., the suspension of the deployable/retractable axle). As shown in FIG. 7, the pressure at the lift axle suspension element (e.g., air spring) may be adjusted as a function of time, which may in turn be correlated with dynamical loading/unloading of the vehicle (i.e., the load may vary as a function of time). As also shown in FIG. 7, Blocks S160 and S170 may be based on the primary suspension load exceeding a threshold pressure (e.g., deployment threshold) and/or falling below the threshold pressure.

Blocks S160 and S170 may be implemented to provide single lift axle control, multiple lift axle control, and/or primary suspension height control in combination with the lift axle control.

The method may include Block S180, which includes: automatically adjusting a fluid pressure in at least one tire of the vehicle, using the fluid suspension system, based on the contextual data. In examples, Block S180 may include managing tire pressures substantially as described in U.S. application Ser. No. 15/805,015, filed 6 Nov. 2017, and incorporated herein in its entirety by this reference. However, Block S180 may include otherwise suitably controlling the pressure(s) in one or more tires of the vehicle.

Figure 8:
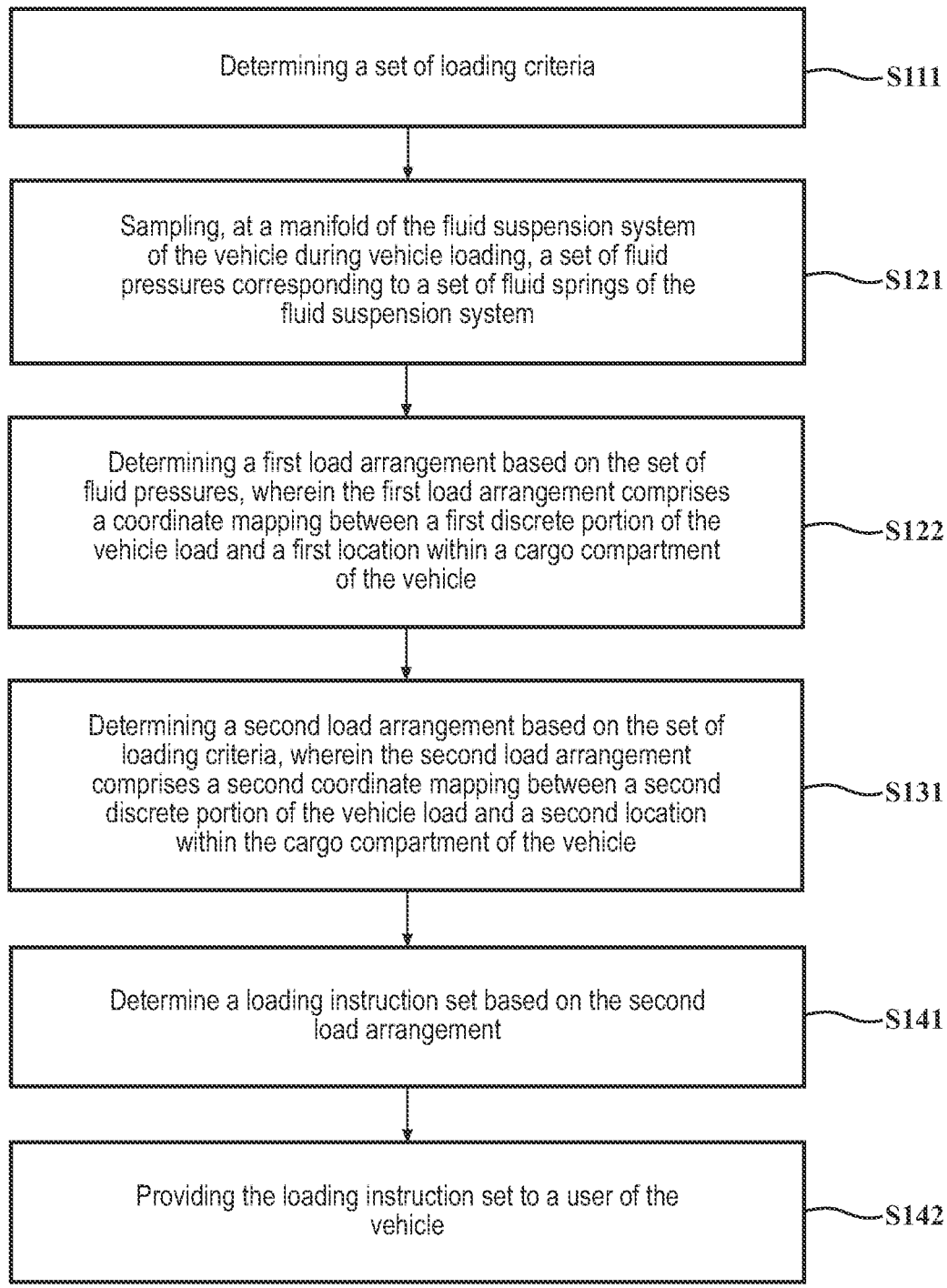
FIG. 8 is a flowchart depiction of a specific example implementation of the method according to the principles of the present disclosure.

A first specific implementation of the method 100, as shown in FIG. 8, includes: determining a set of loading criteria S111; sampling, at a manifold of the fluid suspension system of the vehicle during vehicle loading, a set of fluid pressures corresponding to a set of fluid springs of the fluid suspension system S121; determining a first load arrangement based on the set of fluid pressures, wherein the first load arrangement comprises a coordinate mapping between a first discrete portion of the vehicle load and a first location within a cargo compartment of the vehicle S122; determining a second load arrangement based on the set of loading criteria, wherein the second load arrangement comprises a second coordinate mapping between a second discrete portion of the vehicle load and a second location within the cargo compartment of the vehicle S131; determining a loading instruction set based on the second load arrangement S141; and providing the loading instruction set to a user of the vehicle S142.

Figure 9:
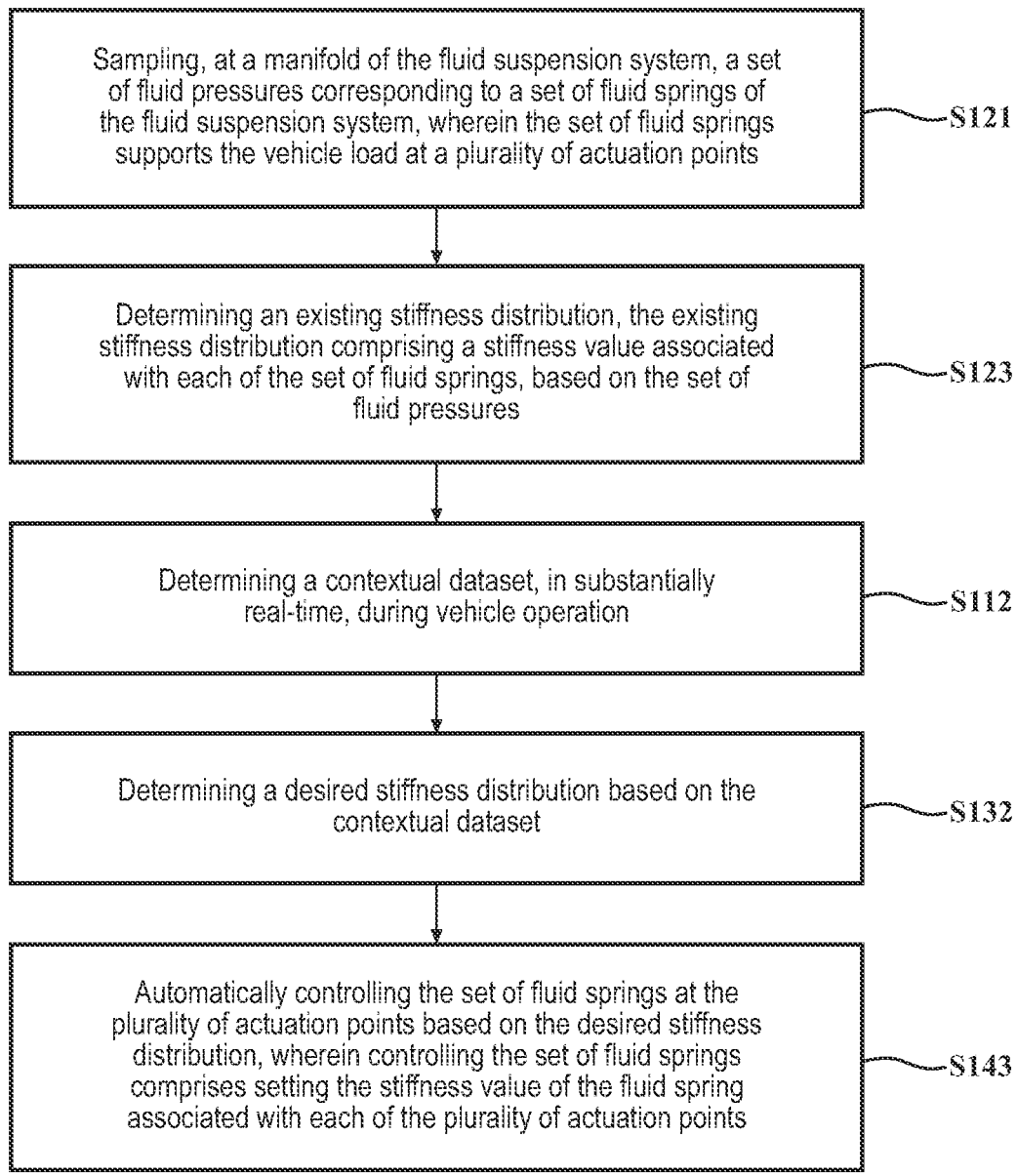
FIG. 9 is a flowchart depiction of a specific example implementation of the method according to the principles of the present disclosure.

A second specific implementation of the method 100, as shown in FIG. 9, includes: sampling, at a manifold of the fluid suspension system, a set of fluid pressures corresponding to a set of fluid springs of the fluid suspension system, wherein the set of fluid springs supports the vehicle load at a plurality of actuation points S121; determining an existing stiffness distribution, the existing stiffness distribution comprising a stiffness value associated with each of the set of fluid springs, based on the set of fluid pressures S123; determining a contextual dataset, in substantially real-time, during vehicle operation S112; determining a desired stiffness distribution based on the contextual dataset S132; and automatically controlling the set of fluid springs at the plurality of actuation points based on the desired stiffness distribution, wherein controlling the set of fluid springs comprises setting the stiffness value of the fluid spring associated with each of the plurality of actuation points S143.

An embodiment of the present disclosure includes a system that intelligently manages tire pressure and lift status on each axle using a Pneumatic Control Module (PCM). In some embodiments, the PCM monitors the wear of each axles may be configured lifts the axles alternatively to distribute wear. The PCM controls height of each axle, or alternatively controls height of one axle and estimates height of the other axles(s) by estimating vehicle load and assigning a target pressure to maintain to achieve a comparable height. This system allows axle wear to be equalized, increasing vehicle uptime, extending service intervals. Additionally, by controlling tire pressure independently per axle, tire life may be extended. By managing tire pressure to the optimal pressure for the load, the tire tread will be in optimal contact to the road, improving braking/traction performance, and the sidewall may operate in its optimal stress/strain envelope, improving tire life. If sensors detect that a tire has an un-sustainable leak or blow-out, or the wheel end has a lube or bearing failure that may cause a imminent thermal issue, the PCM may then lift the individual axle that has the blow-out and focus on the good axle to maintain its tire pressure, enabling a "limp home" state that prevents a costly roadside repair.

In come embodiments, the PCM may measure/estimate vehicle load, command axles to deploy when needed, adjust tire pressure per axle to optimize for individual axle loading, and control suspension height and pressure. The PCM may also interface with Tire Pressure Monitoring Sensors (TPMS). Some potential benefits may include improved tire life, improved tire-road contact to enhance braking and maneuvering performance, improved fuel efficiency through lifting temporarily unnecessary axles, and improved regularity of wear allowing extended service intervals and thus increasing uptime. Further, preventing tire blow-out or wheel end bearing failure, as well as the ability to implement limp-home operation through raising a liftable axle may prevent the necessity of roadside service. Such a system may also allow for real time diagnostics, prognostics, and system health monitoring. Additionally, the system may provide an operator with a pre-trip system checkout, allowing an operator to have forewarning of potential issues or service needs.

In some embodiments, the PCM may include the components and features discussed in U.S. Pat. No. 9,834,056.

Figure 10A:
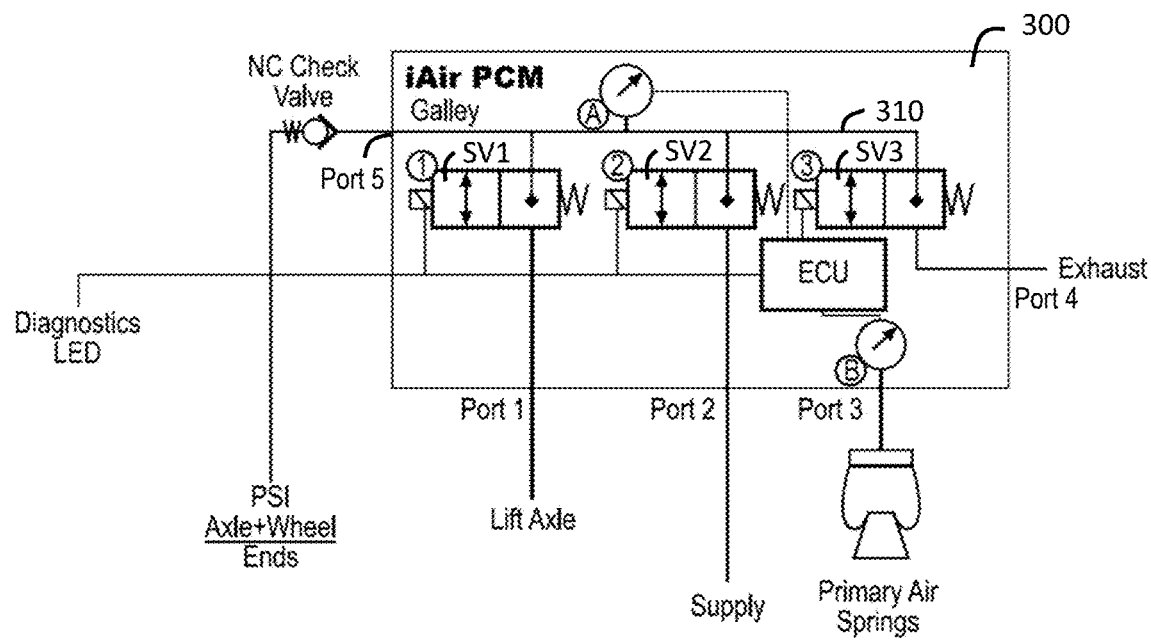
FIGS. 10A-10C are block diagrams of exemplary systems for vehicle load management according to the principles of the present disclosure.
Figure 10B:
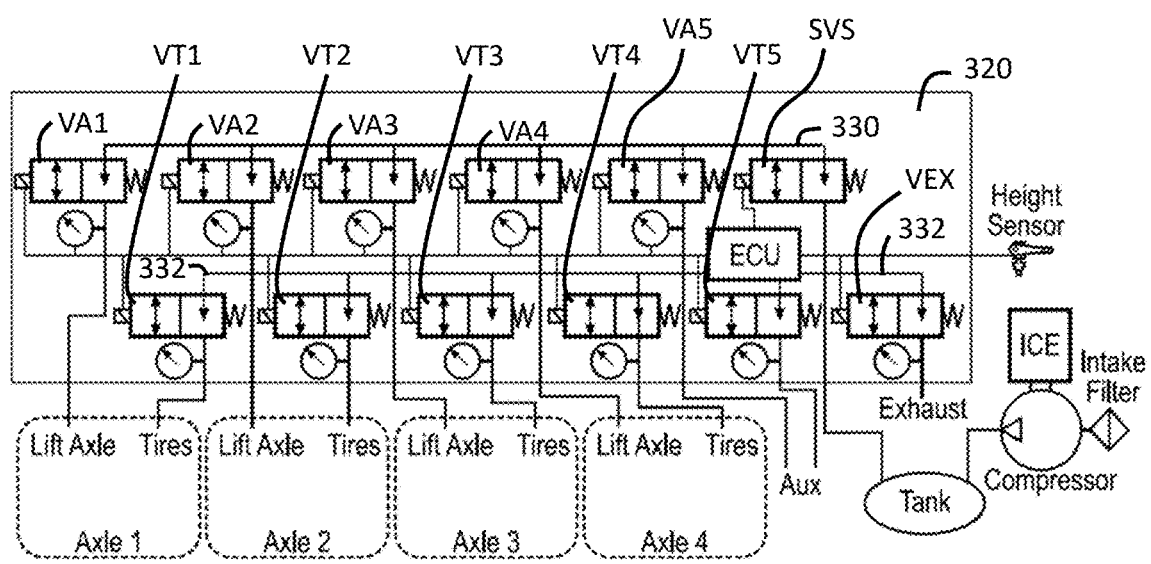
Figure 10C:
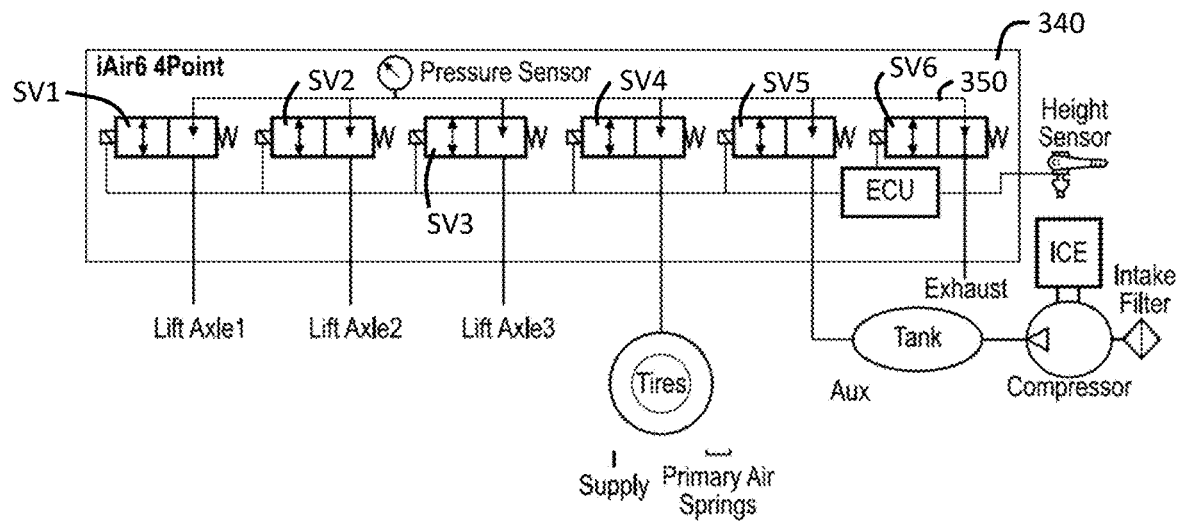

In some embodiments, the PCM may function to measure load then deploys axles to support added loading and modulates tire pressure per load. In some embodiments, the PCM is connected to a solenoid for each axle for controlling tire pressure on a per axle basis. In some embodiments, the PCM is connected to a solenoid for each axle to control primary air spring pressure and lift status on a per-axle basis. In some embodiments, a lift axle control module may be used at each axle to control both tire pressure in order to achieve a ride height and lift status. An electronic height sensor may measure the height between chassis and one of the axles. FIGS. 10A-10C illustrate diagram views of system for vehicle load management each having a plurality of sensors and solenoids for controlling tire pressure and/or spring pressure for axle lift.

FIG. 10A shows a first system for vehicle load management including a first Pneumatic control module (PCM) 300. The first PCM 300 defines a channel 310, also called a galley, for transmitting pressurized air. The first PCM 300 includes a first solenoid valve SV1 configured to control fluid flow between the channel 310 and a first port (Port 1) for supply to an actuator for controlling deployment of a liftable axle. The first PCM 300 includes a second solenoid valve SV2 configured to control fluid flow between a second port (Port 2) and the channel 310 for controlling airflow into the channel 310 from a supply of pressurized air connected to the second port (Port 2). The first PCM 300 also includes a third port (Port 3) providing a fluid connection to primary air springs connected thereto. The first PCM 300 also includes a third solenoid valve SV3 configured to control fluid flow between the channel 310 and a fourth port (Port 4) for exhausting air from the channel 310. The first PCM 300 also includes a fifth port (Port 5) directly fluidly connected to the channel 310 for supplying air to axle and wheel ends via a normally-closed (NC) check valve.

FIG. 10B shows a second system for vehicle load management including a second PCM 320. The second PCM 320 defines a first channel 330 and a second channel 332 for transmitting pressurized air. A first actuator valve VA1 is configured to control fluid flow between the first channel 330 and an actuator for controlling lifting deployment of a first axle. A first tire valve VT1 is configured to control fluid flow between the second channel 332 and tires of the first axle. A second actuator valve VA2 is configured to control fluid flow between the first channel 330 and an actuator for controlling lifting deployment of a second axle. A second tire valve VT2 is configured to control fluid flow between the second channel 332 and tires of the second axle. A third actuator valve VA3 is configured to control fluid flow between the first channel 330 and an actuator for controlling lifting deployment of a third axle. A third tire valve VT3 is configured to control fluid flow between the second channel 332 and tires of the third axle. A fourth actuator valve VA4 is configured to control fluid flow between the first channel 330 and an actuator for controlling lifting deployment of a fourth axle. A fourth tire valve VT4 is configured to control fluid flow between the second channel 332 and tires of the fourth axle. A fifth actuator valve VA5 is configured to control fluid flow between the first channel 330 and an a first auxiliary port. A fifth tire valve VT5 is configured to control fluid flow between the second channel 332 and another auxiliary port. The second PCM 320 also includes a supply solenoid valve SVS configured to control fluid flow between an air supply and the first channel 330. The second PCM 320 also includes an exhaust solenoid valve VEX configured to control fluid flow from the second channel 332 and to an exhaust port.

FIG. 10C shows a third system for vehicle load management including a third PCM 340. The third PCM 340 defines a channel 350 for transmitting pressurized air. The third PCM 340 also includes a first solenoid valve SV1, a second solenoid valve SV2, a third solenoid valve SV3, and a fourth solenoid valve SV4. The first solenoid valve SV1 is configured to control fluid flow between the channel 350 and an actuator for controlling lifting deployment of a first axle. The second solenoid valve SV2 is configured to control fluid flow between the channel 350 and an actuator for controlling lifting deployment of a second axle. The third solenoid valve SV3 is configured to control fluid flow between the channel 350 and an actuator for controlling lifting deployment of a third axle. The fourth solenoid valve SV4 is configured to control fluid flow between the channel 350 and tires of the vehicle. The third PCM 340 also includes a fifth solenoid valve SV5 configured to control fluid flow between an air supply and the channel 350. The third PCM 340 also includes a sixth solenoid valve SV6 configured to control fluid flow from the channel 350 and to an exhaust port.

In some embodiments, when first setting up/configuring the PCM, the installer may assign primary and liftable air suspension tire pressure to load characteristics. In some embodiments, setting up the PCM, individual fields in a configuration tool may allow this input. When first setting up/configuring the PCM lift axle control, the installer will define primary and liftable axle pressure to load characteristics. In some embodiments, while operating, the PCM may receive load and other sensor information and accordingly assign target lift axle and tire pressure to each axle individually utilizing the above characteristics.

In some embodiments, if a tire blowout or unsustainable leak occurs, the PCM will sense it and isolate the leaking axle's remaining tires by exhausting pressure from a control line. In some embodiments, the PCM may continue to manage the other axles independently, including filling leaks and modulating tire pressure per load.

Figure 11:
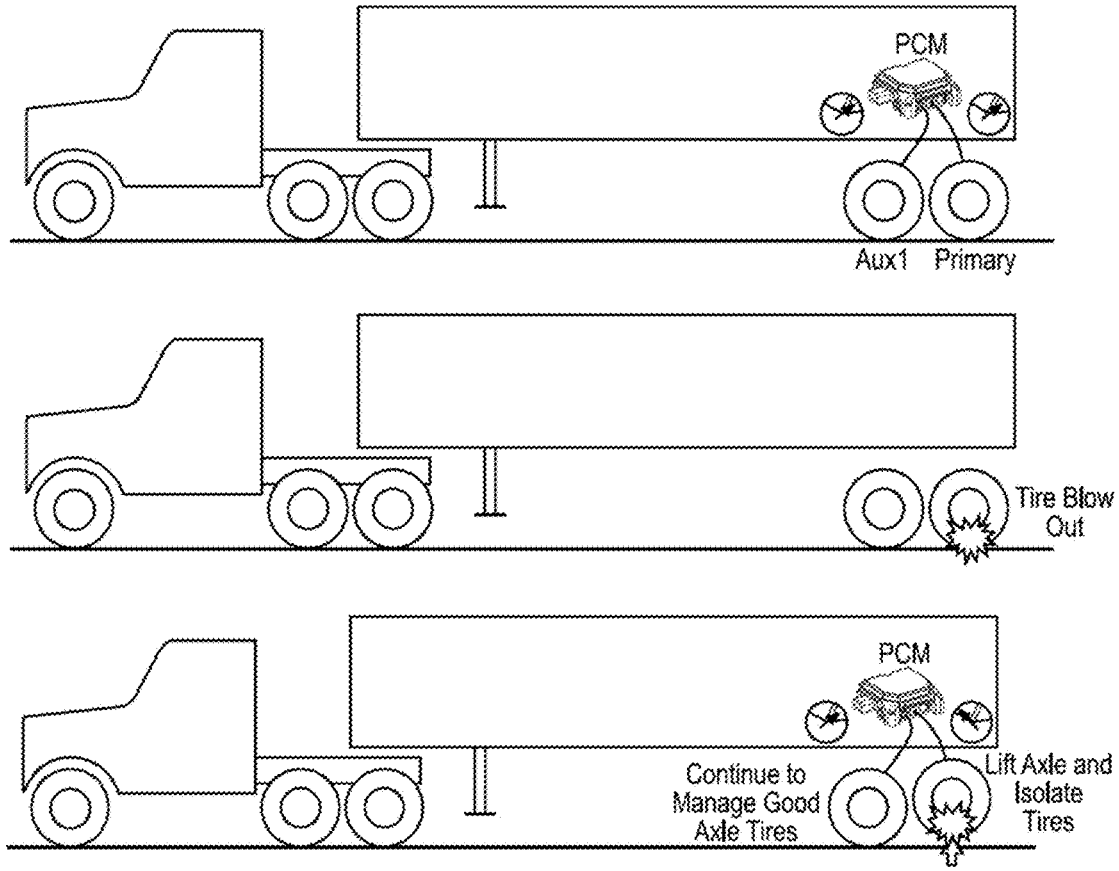
FIG. 11 shows an example of a system for vehicle load management in use and addressing a tire blow out according to the principles of the present disclosure.

In some embodiments, if tire excessive leak occurs, the PCM may raise a liftable axle to prevent blowout, enabling vehicle to operate in limp-home mode to get to a repair station, avoiding costly roadside repairs. Such an approach may be seen in FIG. 11, where pressure sensors in the PCM detect a pressure drop associated with a tire blow out. Following that, the PCM seals off the lifted axle In some embodiments, the PCM may optimize wear by estimating vehicle loading and lifting/deploying axles as needed. For example, when unloaded or lightly loaded and all axles are not needed, one or more liftable axles may be lifted. In some embodiments, a concurrent algorithm may run to estimate wear on each axle, and equalize. Thus, when the algorithm detects a liftable axle has run more miles, it may lift the liftable axle.

Figure 12A:
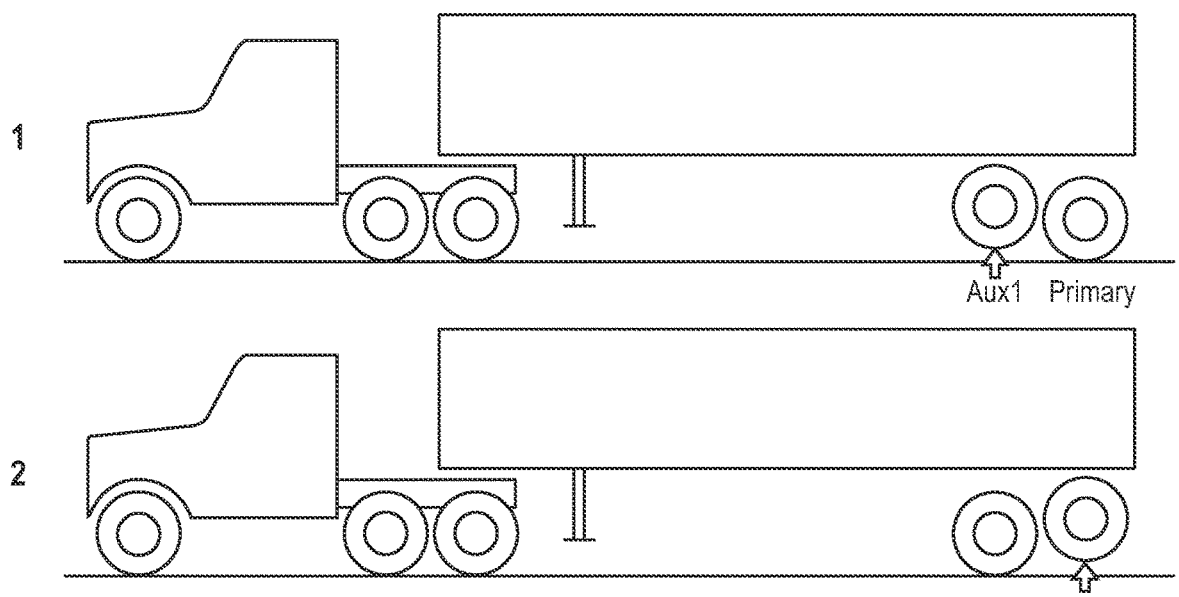
FIGS. 12A-12B show examples of a system for vehicle load management in use and switching load between multiple axles.

In some embodiments, the PCM may deploy a liftable axle to a load sufficient to carry a trailer load using target pressure, particularly when non-liftable axles are needed to carry the trailer load. For example, in some embodiments, if the non-liftable axle has a different suspension or tire, the PCM may adjust the liftable axle to match the non-liftable axles loading to ensure vehicle is riding at correct height. Once the non-liftable axle is at or near target pressure, the PCM may lift the liftable primary axle, allowing for the non-liftable axles to also carry the load. This is shown in FIG. 12A, in which axle Aux1 is lowered and the primary axle is raised.

Figure 12B:
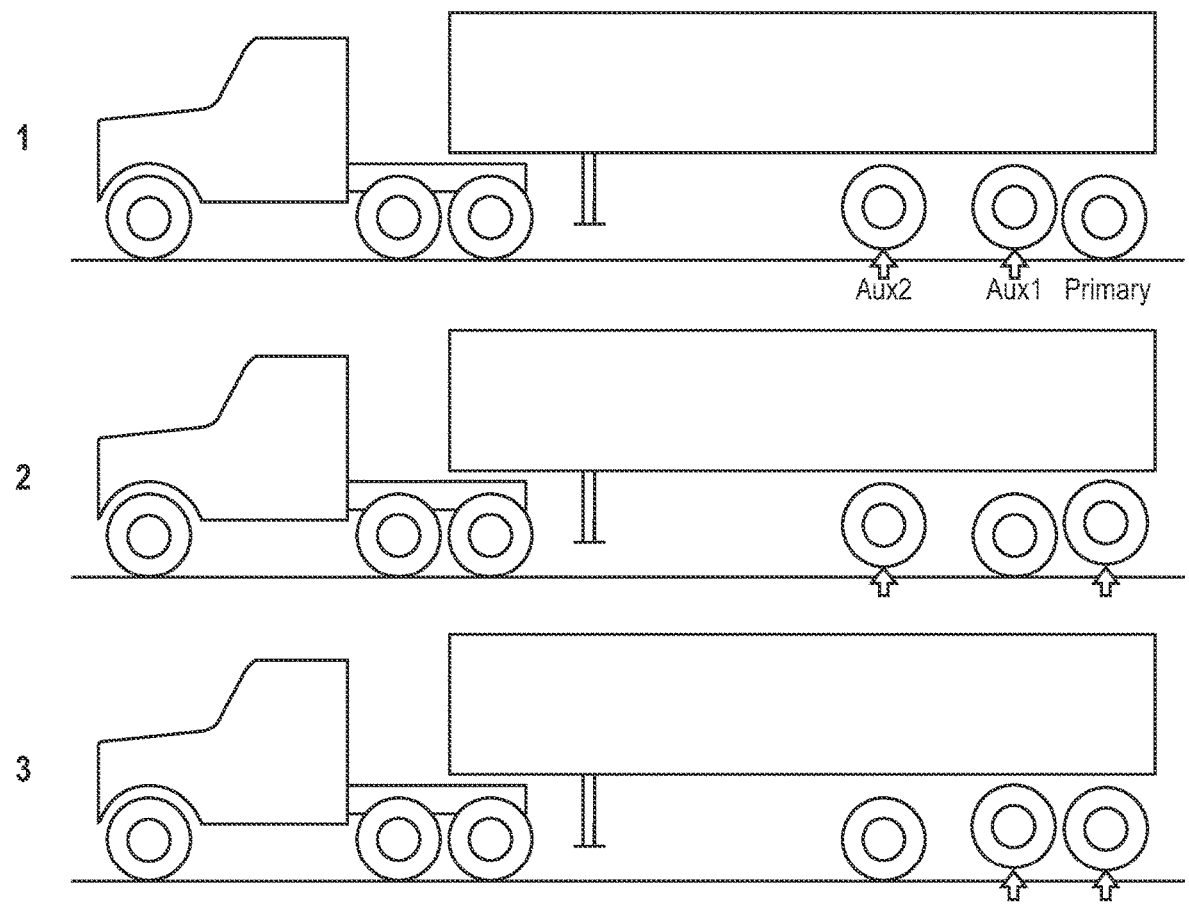

In some embodiments, the PCM may then adjust lift and tire pressure to ensure vehicle rides at consistent height. If the vehicle stops and is disconnected for loading/unloading, then the PCM may cause the liftable axle may deploy again to verify correct height prior lifting again. A load sensor may detect the disconnect, allowing the PCM to detect such a disconnect. As best seen in FIG. 12B, where vehicles have more than two liftable axles, one or more auxiliary axles (axles, in this case, not having associated height sensors) may be deployed. In this case, to reduce wear on the primary axle, the spring pressure for axle Aux1 or axle Aux2 may be made to equalize with the primary axle, and the primary axle may then be lifted. Alternatively, the PCM may deploy both axles Aux1 and Aux2, adjusting the tire and spring pressures intelligently to load the primary axle's load across both Aux1 and Aux2. In this case, the tire pressure may be adjusted intelligently (e.g., lowered) based on splitting the load.

If the vehicle has the same tires on all axles, a simplified system is possible. Individual control of each axles tires is no longer required, and one solenoid may control all tires pressure. A single internal pressure sensor may sense each point of control once the valve is opened (alternatively more pressure sensors may be used to monitor each point). TPMS on each tire may detect a blowout—if a blowout is detected on a particular axle, the tire inflation system may stop actuating/isolate the tires, and lift the axle with the blow out. The vehicle may continue driving, but the tire inflation system will stay in a disabled mode. The TPMS may continue to monitor tire pressures, and if another tire is too low or blows out, the system may choose to lift another axle.

In some embodiments, with the system able to sense and operate as described, the PCM may also send information via telemetry, CAN, wireless, etc to driver and or fleet command center. This data may be used to schedule service, allowing fleets to better manage their vehicles and maximize uptime. Data may also alert fleets and driver to an urgent issue that requires vehicle stoppage to prevent further damage. Data may also be sent/downloaded when vehicle arrives back at fleet command center/dispatch/warehouse yard via wireless or wired connection. This data may be used to generate insights into driver behavior, where good smooth drivers may be rewarded and poor rough drivers be reprimanded/trained to drive better. Data may be used to determine which components are damaged/worn, allowing fleets to purchase service components to ensure parts are ready when vehicle comes in for service—again maximizing uptime. Component life estimate may be generated (with historical data) to drive component replacement based on PCM measured wear/miles—where a component "% life left" metric may be estimated—allowing fleet to replace components before end of life. A dashboard showing each part on the suspension/axle could show "green/yellow/red" to show the manager what parts need to be replaced.

In some embodiments, the PCM uses GPS data to perform adjustments to conform to different jurisdiction's bridge laws. For example. Michigan may allow for more axles on the ground than Ohio; the PCM may be configured to lift axles when GPS data indicates that the vehicle is approaching the Ohio border.

Tri-axis acceleration and loading data may be used in calculating "% life left" metric per component—where specific components life will be more affected by particular acceleration axis. For example, suspension bushings will be more affected by lateral acceleration, shock absorbers more affected by vertical acceleration.

Figure 13:
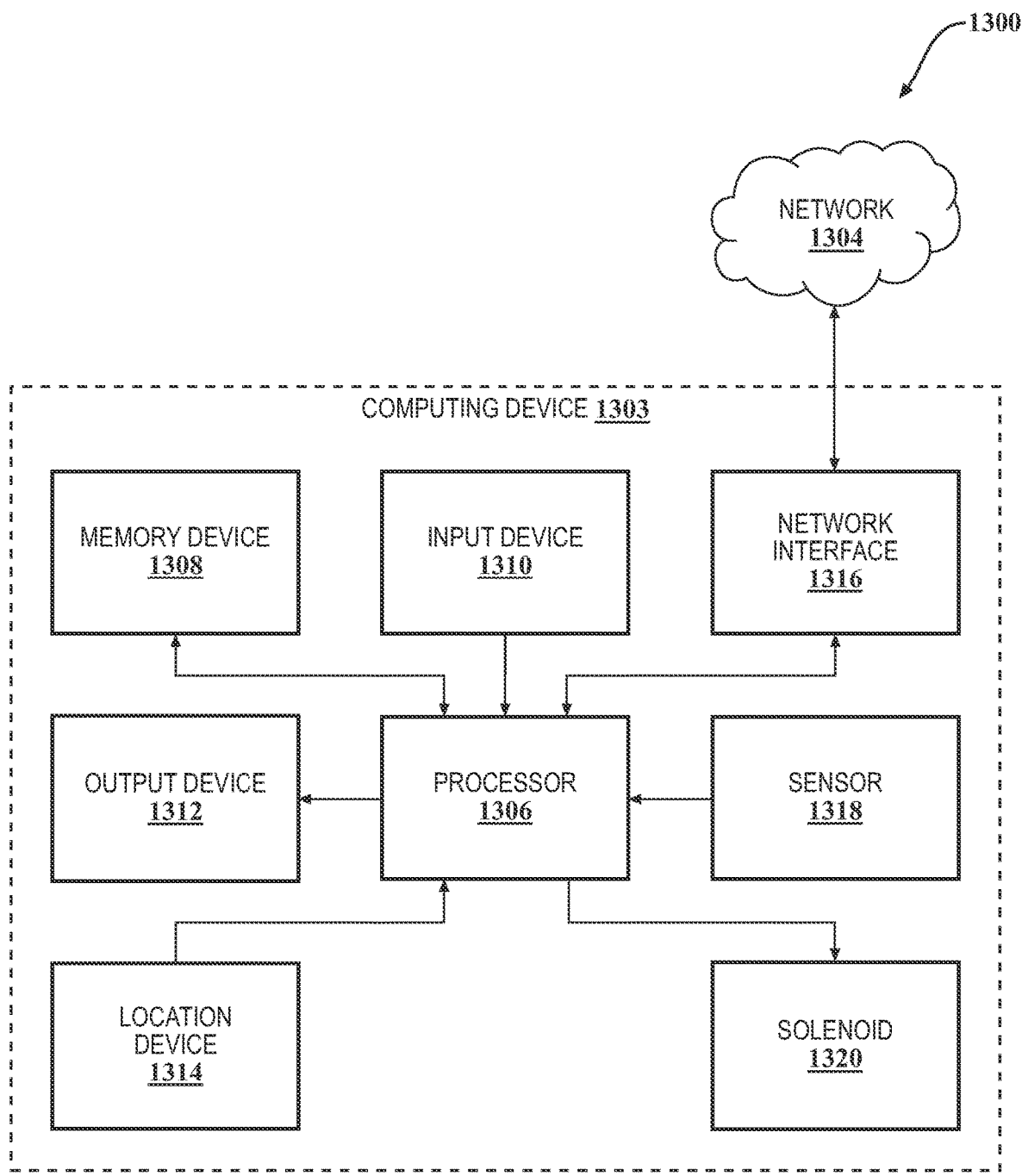
FIG. 13 is a diagram of a system for vehicle load management according to the principles of the present disclosure.

FIG. 13 illustrates a system 1300 for vehicle load management including a computing device 1302 according to the principles of the present disclosure. The computing device that may be connected to a network 1304. The computing device 1302 may be configured to perform various operations and methods. The computing device 1302 may include a processor 1306 configured to control the overall operation of the computing device 1302 and one or more memory devices 1308 that may contain instructions that, when executed by the processor 1306, cause the processor to perform a variety of operations. It should be understood that the processor 1306 (e.g., and/or any processors described herein) may include any suitable processor, including those described herein. The memory device 1308 may include Random Access Memory (RAM), a Read-Only Memory (ROM), or a combination thereof. In some embodiments, the memory device 1308 may include flash memory, semiconductor (solid state) memory, a single disk or a plurality of disks (e.g., hard drives), one or more solid-state drives, or one or more hybrid hard drives.

The computing device 1302 may also include an input device 1310 that may be configured to receive input from an operator of the computing device 1302 and to communicate signals representing the input received to the processor 1306. For example, the input device 1310 may include a button, keypad, dial, touch screen, audio input interface (e.g., microphone), visual/image capture input interface, input in the form of sensor data, etc.

The computing device 1302 may include an output device 1312 (e.g., a display screen, speaker, or any other suitable output device) that may be controlled by the processor 1306 to present information to the operator. The computing device 1302 may also include a location device 1314 (e.g., a global positioning system (GPS) receiver configured to receive information from one or more global navigation satellite systems (GNSS), cell towers, base stations, and the like). The computing device 1302 may also include a network interface 1316 configured to couple or connect the computing device 1302 to various other computing devices or the network 1304 devices via a network connection, such as a wired or wireless connection. In some embodiments, the network interface 1316 includes a wireless transceiver. In some embodiments, the network interface 1316 is in communication the vehicle (e.g., through a wired connection, such as a controller area network (CAN) bus).

In some embodiments, the system 1300 may include one or more sensors 1318 in communication with the processor 1306. The one or more sensors 1318 may be included in or external to the computing device. In some more embodiments, the system may include and configured to actuate one or more solenoids 1320. In some embodiments, the system 1300 includes one or more of the features of the discussed PCM. In some embodiments, the PCM contains one or more components of the system 1300.

In some embodiments, the system 1300 may include additional, fewer, or other components than those described with respect to and illustrated in FIG. 13. In some embodiments, any or all of the components of the system 1300 may be integral to or remote from the PCM.

In some embodiments, the instructions contained in the memory 1308 may cause the processor 1306 to receive a remote signal from a remote device by way of the network device. For example, a user on a remote device may, through an application or through other means, input information about the vehicle, tires, axles, future route, planned loads, service plan, etc. by way of the network interface 1316. As another example, a remote server may transmit this information to the processor 1306 by way of the network interface 1316 as part of a fleet management system.

In some embodiments, the instructions may cause the processor 1306 to determine a loading criteria. In some embodiments, the loading criteria may be based on the remote signal. For example, the remote signal may contain information about the load expected for the vehicle at different points along a given route and vehicle, axle, and/or tire status (e.g., how many miles are on each of these components). The processor 1306 may use this information to determine when and where the vehicle will be under different loads, allowing for scheduling axles to be raised and lowered in order to optimize component wear.

In some embodiments, the instructions causes the processor 1306 to receive a first indicator signal from a first sensor (i.e., one of the sensors 1318). In some embodiments, the first sensor may be a tire pressure sensor configured to provide measurements of the tire pressure of a first tire or a first set of tires that rotate about a first axle in the form of a first tire pressure signal In some embodiments, the first sensor may be a first wheel end sensor connected to the first axle, the first tire or the first set of tires, or a first wheel and configured to provide measurements of or proximate to the first axle, the first tire or the first set of tires, or the first wheel in the form of a first wheel end indicator signal, in some embodiments, the first wheel end sensor may be a first wheel end temperature sensor configured to provide temperature information to the processor. In some embodiments, the first wheel end sensor may be a first wheel end accelerometer configured to provide acceleration information from the first wheel end of the first axle. In some embodiments, the first sensor may be a first load sensor connected to the vehicle and configured to measure a load of the vehicle (e.g., a load on a portion of the vehicle) in the form of a first load indicator signal from to measure a first load of the vehicle. In some embodiments, the first sensor may be a first height sensor connected to the vehicle and configured to measure and provide a distance (e.g., height) within the vehicle in the form of a first height indicator signal. In some embodiments, second height sensor may be configured to measure height between at least one axle and a chassis of the vehicle. In some embodiments, the at least one axle may be the first axle.

In some embodiments, the instructions may cause the processor 1316 to receive a second indicator signal from a second sensor (i.e., one of the sensors 1318). In some embodiments, the second sensor may be a tire pressure sensor configured to provide measurements of the tire pressure of a second tire or a second set of tires that rotate about a second axle in the form of a second tire pressure signal. In some embodiments, the second sensor may be a second wheel end sensor connected to the second axle, the second tire or the second set of tires, or a second wheel and configured to provide measurements of or proximate to the second axle, the second tire or the second set of tires, or the second wheel in the form of a second wheel end indicator signal. In some embodiments, the second wheel end sensor may be a second wheel end temperature sensor configured to provide temperature information to the processor. In some embodiments, the second wheel end sensor may be a second wheel end accelerometer configured to provide acceleration information from the second wheel end of the second axle. In some embodiments, the second sensor may be a second load sensor connected to the vehicle and configured to measure a load of the vehicle (e.g., a load on a portion of the vehicle) in the form of a second load indicator signal from to measure a second load of the vehicle. In some embodiments, the second sensor may be a second height sensor connected to the vehicle and configured to measure and provide a distance (e.g., height) within the vehicle in the form of a second height indicator signal. In some embodiments, second height sensor may be configured to measure height between at least one axle and a chassis of the vehicle. In some embodiments, the at least one axle may be the second axle. In some embodiments, the at least one axle may be a third axle. In some embodiments, In some embodiments, the instructions may cause the processor 1316 to determine a dynamical model of vehicle operation. In some embodiments, determining the dynamical model of vehicle operation is based at least in part on the loading criteria. For example, the loading criteria may indicate an initial load and component wear starting point. In some embodiments, determining the dynamical model of vehicle operation may be based at least in pan on the first indicator signal. In some embodiments, determining the dynamical model of vehicle operation may be based at least in part on the second indicator signal. For some examples, the indicator signals may result in modifying the dynamical model, updating it as tire leaks are detected by the tire pressure sensors, unexpected changes are detected by the wheel end accelerometers or wheel end temperature sensors, or when the load sensors detect that the load is higher or lower than anticipated.

In some embodiments, the instructions cause the processor 1306 to, based on least in part to the first indicator signal, determine a vehicle load intervention. In some embodiments, determining the vehicle load intervention may be based at least in part on the second indicator signal. For example, if tire pressure is found to be dropping on a liftable axle that is in contact with the ground, the processor 1306 may determine that the vehicle load intervention should be the liftable axle may be lifted to avoid a blowout and the tire pressures in the other axles may be increased based on detected tire pressures in order to prevent the remaining (now more heavily loaded) axles from being underpressurized. In some embodiments, determining the vehicle load intervention may be based at least in part on the loading criteria. For example, in cases where there is not a load sensor but the loading criteria contains information about the intended load, the vehicle intervention may more optimally calculate a new desired tire pressure if a liftable axle is being lifted. In some embodiments, determining the vehicle load intervention may be based at least in part on the dynamical model of vehicle operation. For example, the dynamical model may be updating based on the time a first liftable axle is in contact with the ground and may switch to a second liftable axle being in contact with the ground to evenly wear the brakes and tires of the two liftable axles. In some embodiments, determining the vehicle load intervention may be based at least in part on the remote signal. For example, the remote signal may have indicated that only a certain number of miles remain on a liftable axle, and the liftable axle may lift after those miles have changed. In some embodiments, the dynamical model may be used to determine the air spring pressure and tire pressure required in axles to be deployed based on the tire and air spring pressures of currently deployed axles. As another example, when moving from one deployed axle to two deployed axles, the desired air spring and tire pressures of each of the deployed axles may be different to avoid changes in height and overloading. The dynamical models and/or loading criteria may be used to determine these target pressures.

In some embodiments, the instructions cause the processor 1306 to, based on the vehicle intervention, transmit one or more adjustment signals to cause one or more vehicle load adjustments to occur. For example, the processor 1306 may transmit an adjustment signal to a solenoid 1318, causing the solenoid to open a valve and reduce the pressure of a tire or set of tires. In some embodiments, the one or more vehicle load adjustments may include at least one tire or at least one set of tires being inflated. In some embodiments, the one or more vehicle load adjustments may include at least one tire or at least one set of tires being deflated. In some embodiments, the at least one tire may include the first tire. In some embodiments, the at least one tire may include the second tire. In some embodiments, the at least one tire may include a third tire. In some embodiments, the at least one set of tires may include the first set of tires. In some embodiments, the at least one set of tires may include the second set of tires. In some embodiments, the at least one set of tires may a third set of tires. In some embodiments, the one or more adjustments may include a liftable axle being raised. In some embodiments, the one or more adjustments may include the liftable axle being lowered. In some embodiments, the liftable axle is the first axle. In some embodiments, the liftable axle may include the second axle. In some embodiments, the liftable axle may include a third axle. In some embodiments, the one or more adjustments may include varying combinations of one or more tires being inflated or deflated and one or more liftable axles being raised or lowered. In some embodiments, the one or more adjustments may include sealing off a tire that has experienced blowout from the remainder of an integrated tire inflation system. In some embodiments, a plurality of liftable axles may each be configured to be individually movable responsive to one or more adjustment signals from the processor. In some embodiments, a plurality of tires may each be configured to be separately inflated and deflated responsive to one or more adjustment signal from the processor. In some embodiments, the plurality of respective tire sets may be connected to a plurality of respective axles and may each be separately inflatable and deflatable responsive to one or more adjustment signals from the processor. In some embodiments, the vehicle load intervention may involve multiple adjustments, such as raising one axle and lowering two axles, raising two tire pressures, raising one axle and lowering another axle, raising or lowering axles and raising or lowering tire pressures concurrently, etc. In some embodiments, the adjustments may occur over time, such as by lowering two axles, then adjusting the tire pressures associated therewith to target tire pressures, and then raising another axle.

In some embodiments, the instructions may further cause the processor 1306 to, based on the first indicator signal, transmit a notification signal to cause a notification to be displayed on a display device of an operator of the vehicle. For example, the processor 1306 may, by way of the network interface 1316, transmit a notification signal to a device of a driver of the vehicle, indicating that a repair is needed. For the purposes of this disclosure, an operator is broad and does not need to be a human driver of a vehicle, it can, for example, include a computer controller of a vehicle, an in-person supervisor of the vehicle, a remote supervisor of the vehicle, and a fleet coordinator in charge of the vehicle.

In some embodiments, the instructions may further cause the processor 1306 to, based on the first indicator signal, transmitting a vehicle status indicator signal to a remote device. For example, the processor 1306 may, by way of the network interface 1316, transmit a vehicle status indicator indicating unusual temperatures in an axle to a server of a fleet management firm, allowing the firm to change the maintenance schedule for the vehicle.

Figure 14:
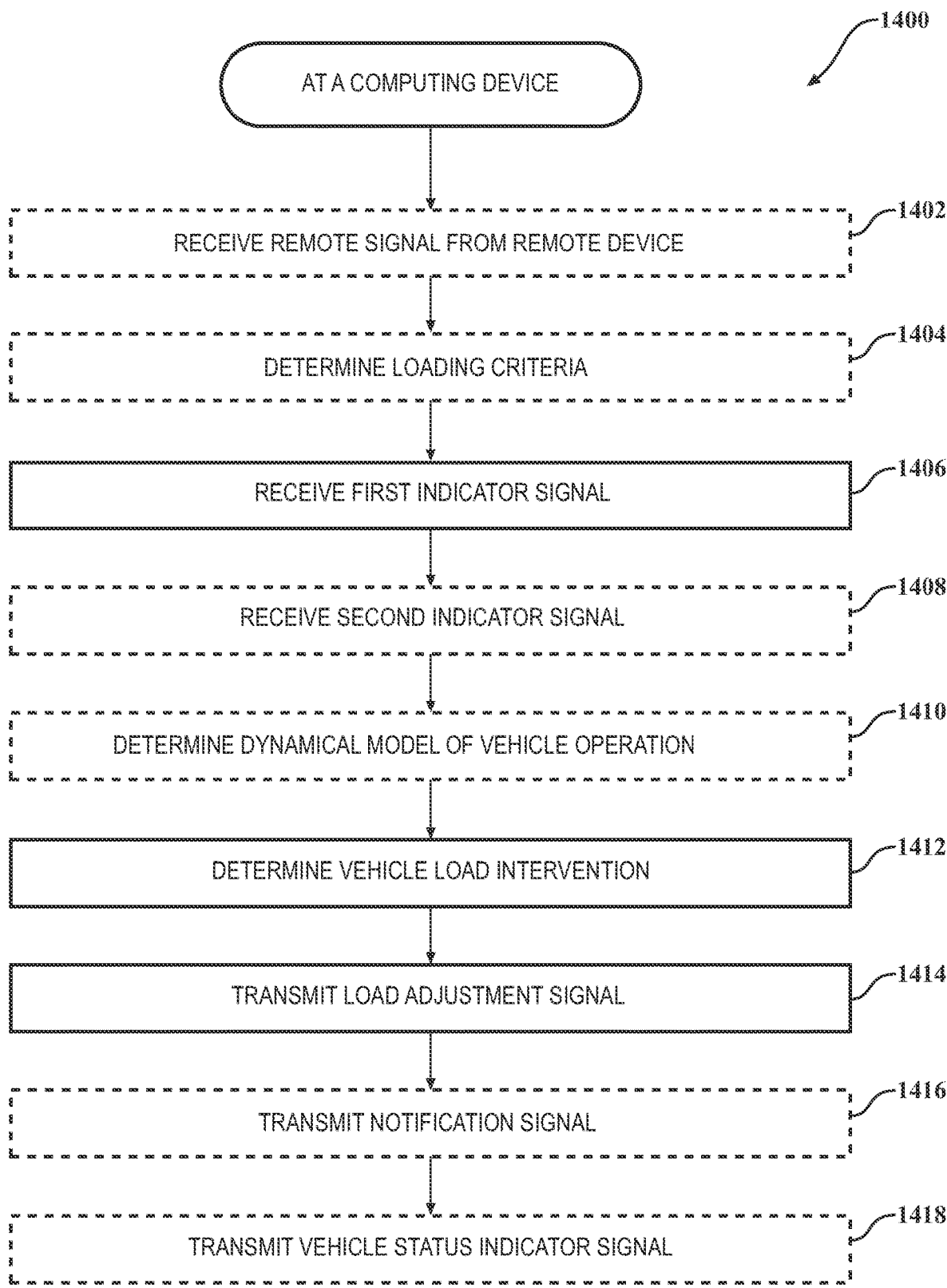
FIG. 14 is a flowchart depiction of an exemplary method for vehicle load management according to the principles of the present disclosure.

FIG. 14 shows a method 1400 for vehicle load management according to some embodiments of the present disclosure.

At 1402, the method 1400 may include receiving a remote signal from a remote device.

At 1404, the method 1400 may include determining a loading criteria.

At 1406, the method 1400 includes receiving a first indicator signal from the first sensor.

At 1408, the method 1400 may include receiving a second indicator signal from the second sensor.

At 1410, the method 1400 may include determining a dynamical model of vehicle operation At 1412, the method 1400 includes, based at least in part on the first indicator signal, determining a vehicle load intervention.

At 1414, the method 1400 may include, based on the vehicle load intervention, transmitting one or more adjustment signals to cause one or more vehicle load adjustments to occur.

At 1416, the method 1400 may include based on the first indicator signal, transmitting a notification signal to cause a notification to be displayed on a display device of an operator of the vehicle.

At 1418, the method 1400 may include, based on the first indicator signal, transmitting a vehicle status indicator signal to a remote device.

An alternative embodiment preferably implements the above methods in a computer-readable medium storing computer-readable instructions. The instructions are preferably executed by computer-executable components preferably integrated with a fluid suspension control unit. The fluid suspension control unit may include a pressure control system, a manifold, and any other suitable components. The computer-readable medium may be stored on any suitable computer readable media such as RAMs. ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

To the extent that sensors "provide measurements" in the claims and specification, this is not intended to be limited to exact measurements in units, and may include information or indicators of some measurable quantity (e.g., temperature, pressure, acceleration, load, height, etc.) surpassing a threshold.

Although omitted for conciseness, the preferred embodiments include every suitable combination and permutation of the various system components and the various method processes, wherein the method processes may be performed in any suitable order, sequentially or concurrently.

The above discussion is meant to be illustrative of the principles and various embodiments of the present invention. Numerous variations and modifications will become apparent to those skilled in the art once the above disclosure is fully appreciated. For example, the proceeding methods may further include steps such as displaying associated cross-streets with the list of available surrogates, including a map showing the general locations of the surrogates, only providing contact information to the surrogates or requestor once a surrogacy request has been accepted (e.g., confirmed), verifying an identification (ID) of surrogates, displaying all or a portion of a verified ID or verified ID indicator associated with individual surrogates, receiving reviews and/or comments from requestors relating to the performance of individual surrogates, anonymizing or limiting contact information, requiring further verifications and confirmations, etc. Further, the constituent steps and components of the methods and systems described herein may be combined and organized in any suitable manner. It is intended that the following claims be interpreted to embrace all such variations and modifications.

To the extent that the claims may recite a "second" element, it is not intended to be read that there must be at least two of such elements when the "first" element may be one selected from a list including the "first" element.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein may be realized in hardware, software, or any combination thereof. The hardware may include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module may include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module may include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module may include memory that stores instructions executable by a controller to implement a feature of the module Further, in one aspect, for example, systems described herein may be implemented using a general-purpose computer or general-purpose processor with a computer program that, when executed, carries out any of the respective methods, algorithms, and/or instructions described herein. In addition, or alternatively, for example, a special purpose computer/processor may be utilized which may contain other hardware for carrying out any of the methods, algorithms, or instructions described herein.

Further, all or a portion of implementations of the present disclosure may take the form of a computer program product accessible from, for example, a computer-usable or computer-readable medium. A computer-usable or computer-readable medium may be any device that can, for example, tangibly contain, store, communicate, or transport the program for use by or in connection with any processor. The medium may be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A system for vehicle load management of a vehicle, comprising:
   a processor;
   a memory in communication with the processor and including instructions that, when executed by the processor, cause the processor to:
   receive a first indicator signal from a first sensor, the first indicator signal comprising one or more of:
   a first tire pressure indicator signal from a first tire pressure sensor configured to measure a first tire pressure of a first tire configured to rotate about a first axle;
   a first wheel end indicator signal from a first wheel end sensor connected to the first axle, the first tire, or a first wheel connected to the first axle, configured to provide measurements of or proximate to the first axle, the first tire, or the first wheel, and comprising at least one of:
   a first wheel end temperature sensor; and
   a first wheel end accelerometer;
   a first load indicator signal from a first load sensor connected to the vehicle and configured to measure a first load of the vehicle; and
   a first height indicator signal from a first height sensor connected to the vehicle and configured to measure a distance within the vehicle;
   based at least in part on the first indicator signal, determine a vehicle load intervention; and
   based on the vehicle load intervention, transmit one or more adjustment signals to cause one or more vehicle load adjustments to occur, the one or more vehicle load adjustments comprising at least one of:
   raising a liftable axle toward an undercarriage of the vehicle and away from contact with the ground; or lowering the liftable axle away from the undercarriage of the vehicle and into contact with the ground.

2. The system of claim 1, wherein the memory and the processor are integral parts of a pressure control module.

3. The system of claim 2, wherein the first sensor is integral with the pressure control module.

4. The system of claim 3, wherein the first sensor is the tire pressure sensor.

5. The system of claim 1, wherein the instructions further cause the processor to:
determine a loading criteria;
determine a dynamical model of vehicle operation based at least in part on the loading criteria; and
wherein determining a vehicle load intervention is based at least in part on the dynamical model of vehicle operation.

6. The system of claim 5, wherein determining the dynamical model of vehicle operation is based at least in part on the first indicator signal.

7. The system of claim 1, wherein the first height sensor is configured to measure height between at least one axle and a chassis of the vehicle.

8. The system of claim 1, wherein determining the vehicle load intervention is based at least on vehicle component wear optimization.

9. The system of claim 1, wherein all axles are liftable.

10. The system of claim 1, wherein the instructions further cause the processor to:
determine a loading criteria; and
wherein determining the vehicle load intervention is based at least in part on the loading criteria.

11. The system of claim 1, wherein the instructions further cause the processor to:
receive a remote signal from a remote device; and
determine a dynamical model of vehicle operation based at least in part on the remote signal; and
wherein determining a vehicle load intervention is based at least in part on the dynamical model of vehicle operation.

12. The system of claim 1, the instructions further cause the processor to:
based on the first indicator signal, transmit a notification signal to cause a notification to be displayed on a display device of an operator of the vehicle.

13. The system of claim 1, the instructions further cause the processor to:
based on the first indicator signal, transmit a vehicle status indicator signal to a remote device.

14. The system of claim 1, wherein the instructions further cause the processor to:
receive a second indicator signal from a second sensor, the second indicator signal comprising one or more of:
a second tire pressure indicator signal from a second tire pressure sensor configured to measure a second tire pressure of a second tire configured to rotate about a second axle;
a second wheel end indicator signal from a second wheel end sensor connected to the second axle, the second tire, or a second wheel connected to the second axle, configured to provide measurements of or proximate to the second axle, the second tire, or the second wheel, and comprising at least one of:
a second wheel end temperature sensor; and
a second wheel end accelerometer;
a second load indicator signal from a second load sensor connected to the vehicle and configured to measure a second load of the vehicle; and
a second height indicator signal from a second height sensor connected to the vehicle and configured to measure a distance within the vehicle; and
wherein determining a vehicle load intervention is based at least in part on the second indicator signal.

15. The system of claim 1, wherein a plurality of liftable axles are each configured to be individually movable responsive to the one or more adjustment signals from the processor.

16. The system of claim 1, wherein a plurality of respective tire sets connected to a plurality of respective axles are each separately inflatable and deflatable responsive to the one or more adjustment signals from the processor.

17. The system of claim 1, wherein a plurality of tires are each configured to be separately inflated and deflated responsive to the one or more adjustment signals from the processor.

18. The system of claim 1, wherein the first sensor is configured to detect a blowout event.

19. The system of claim 1, wherein the instructions further cause the processor to:
receive a remote signal from a remote device; and
wherein determining a vehicle load intervention is based at least in part on the remote signal.

20. A method for axle and tire management of a vehicle, comprising:
receiving a first indicator signal from a first sensor, the first indicator signal comprising one or more of:
a first tire pressure indicator signal from a first tire pressure sensor configured to measure a first tire pressure of a first tire configured to rotate about a first axle;
a first wheel end indicator signal from a first wheel end sensor connected to the first axle, the first tire, or a first wheel connected to the first axle, configured to provide measurements of or proximate to the first axle, the first tire, or the first wheel, and comprising at least one of:
a first wheel end temperature sensor; and
a first wheel end accelerometer;
a first load indicator signal from a first load sensor connected to the vehicle and configured to measure a first load of the vehicle; and
a first height indicator signal from a first height sensor connected to the vehicle and configured to measure a distance within the vehicle;
based at least in part to the first indicator signal, determining a vehicle load intervention; and
based on the vehicle load intervention, transmitting one or more adjustment signals to cause one or more vehicle load adjustments to occur, the one or more vehicle load adjustments comprising at least one of:
raising a liftable axle toward an undercarriage of the vehicle and away from contact with the ground; or
lowering the liftable axle away from the undercarriage of the vehicle and into contact with the ground.

21. A control unit for load management of a vehicle, comprising:
a manifold defining: a channel configured to be connected to a fluid source, a first discharge port configured to be connected to one or more tires of the vehicle, and a second discharge port configured to be connected to an actuator for controlling deployment of a liftable axle;

a first control valve configured to selectively control air flow between the channel and the first discharge port for inflating the one or more tires of the vehicle; and a second control valve configured to selectively control air flow between the channel and the second discharge port for controlling the deployment of the liftable axle, and wherein controlling the deployment of the liftable axle includes each of: deploying the liftable axle into contact with the ground, and retracting the liftable axle away from contact with the ground.

22. The control unit of claim 21, further comprising: a printed circuit board assembly connected to each of the first control valve and the second control valve.

23. The control unit of claim 21, further comprising: a third control valve configured to selectively control air flow between the channel and a third discharge port for controlling deployment of a second liftable axle, and wherein the second liftable axle is independent of the liftable axle.

24. The control unit of claim 21, further comprising: a pressure sensor configured to measure a fluid pressure in the channel.

25. The control unit of claim 21, further comprising: a pressure sensor configured to measure a fluid pressure in the first discharge port.

26. The control unit of claim 21, wherein the first control valve and the second control valve are each associated with a same axle of the vehicle, and wherein the control unit further includes additional control values configured to control tire inflation and lift axle deployment of one or more additional axles of the vehicle.

27. A method for vehicle load management, comprising:

determining, by an electronic control unit, a pressure parameter value based on one or more measured pressures; and commanding, by the electronic control unit and based on the pressure parameter value, a first control valve to an open position to conduct fluid from an air source and to inflate one or more tires;

commanding, by the electronic control unit, a second control valve to cause a liftable axle to be raised or lowered; and determining, by the electronic control unit, satisfaction of a deployment criterion for deploying the lift axle, and wherein commanding the second control valve to cause the liftable axle to be raised or lowered further includes commanding the second control valve to cause the liftable axle to be lowered in response to the satisfaction of the deployment criterion.

* * * * *